US012614496B2

(12) United States Patent
Huang et al.

(10) Patent No.: US 12,614,496 B2
(45) Date of Patent: Apr. 28, 2026

(54) METHOD FOR DRIVING DISPLAY PANEL, AND DISPLAY APPARATUS

(71) Applicants: Fuzhou BOE Optoelectronics Technology Co., Ltd., Fujian (CN); BOE Technology Group Co., Ltd., Beijing (CN)

(72) Inventors: Qiaohong Huang, Beijing (CN); Zuwei Weng, Beijing (CN); Bin Weng, Beijing (CN); Yupeng Huang, Beijing (CN); Bao Liu, Beijing (CN)

(73) Assignees: Fuzhou BOE Optoelectronics Technology Co., Ltd., Fuzhou (CN); BOE Technology Group Co., Ltd., Beijing (CN)

( * ) Notice: Subject to any disclaimer, the term of this patent is extended or adjusted under 35 U.S.C. 154(b) by 186 days.

(21) Appl. No.: 18/687,598

(22) PCT Filed: Nov. 17, 2021

(86) PCT No.: PCT/CN2021/131298
§ 371 (c)(1),
(2) Date: Feb. 28, 2024

(87) PCT Pub. No.: WO2023/087187
PCT Pub. Date: May 25, 2023

(65) Prior Publication Data
US 2024/0355258 A1 Oct. 24, 2024

(51) Int. Cl.
*G09G 3/20* (2006.01)

(52) U.S. Cl.
CPC ... *G09G 3/2074* (2013.01); *G09G 2320/0233* (2013.01); *G09G 2320/0626* (2013.01); *G09G 2330/021* (2013.01)

(58) Field of Classification Search
CPC ......... G09G 3/2074; G09G 2320/0233; G09G 2320/0626; G09G 2330/021; G09G 3/3614; G09G 3/20; G09G 3/36
See application file for complete search history.

(56) References Cited

U.S. PATENT DOCUMENTS 8,786,536 B2 7/2014 Kim
9,299,318 B2 * 3/2016 Oh ...................... G09G 3/3225
(Continued)

FOREIGN PATENT DOCUMENTS

CN 1924649 A 3/2007
CN 101135825 A 3/2008
(Continued)

OTHER PUBLICATIONS

Chinese First Office Action, mailed Apr. 10, 2025, from Chinese App. No. 202180003412.9, 35 pages.
(Continued)

*Primary Examiner* — William Lu
(74) *Attorney, Agent, or Firm* — Workman Nydegger

(57) ABSTRACT

A method for driving a display panel, and a display apparatus. An example of the method includes: receiving display data of an image to be displayed of the current display frame; and according to the display data, controlling a display panel to sequentially load a gate-on signal to gate lines, and to input a voltage into a data line, and when there is an overlap time between gate-on signals loaded to M adjacent gate lines, a pre-charging voltage and a compensation voltage are sequentially charged to a sub-pixel electrically connected to an Mth gate line among the M gate lines within the overlap time, M being an integer and M≥2.

15 Claims, 11 Drawing Sheets

(56) References Cited

U.S. PATENT DOCUMENTS

| | | | | |
|---|---|---|---|---|
| 10,522,100 | B2 * | 12/2019 | Jeong | G09G 3/3607 |
| 10,665,148 | B2 | 5/2020 | Kang et al. | |
| 11,087,685 | B1 * | 8/2021 | Lu | G09G 3/3233 |
| 2004/0246224 | A1 * | 12/2004 | Tsai | G09G 3/3648 345/100 |
| 2005/0110726 | A1 | 5/2005 | Shin | |
| 2005/0168491 | A1 * | 8/2005 | Takahara | H10K 59/88 345/690 |
| 2006/0192745 | A1 * | 8/2006 | Yamazaki | G02F 1/13624 345/100 |
| 2006/0221015 | A1 * | 10/2006 | Shirasaki | G09G 3/325 345/77 |
| 2007/0046609 | A1 | 3/2007 | Lee et al. | |
| 2008/0001893 | A1 * | 1/2008 | Moon | G09G 3/3648 345/98 |
| 2010/0207928 | A1 * | 8/2010 | Lee | G11C 19/184 345/213 |
| 2011/0242140 | A1 * | 10/2011 | Lee | G09G 3/3648 345/89 |
| 2013/0169619 | A1 * | 7/2013 | Jeong | G09G 5/001 345/212 |
| 2014/0320521 | A1 * | 10/2014 | Oh | G09G 3/3648 345/601 |
| 2014/0368415 | A1 * | 12/2014 | Kim | G09G 3/3233 345/77 |
| 2015/0035866 | A1 * | 2/2015 | Ahn | G09G 3/3648 345/690 |
| 2016/0049123 | A1 * | 2/2016 | Jeong | G09G 3/3607 345/88 |
| 2016/0180817 | A1 * | 6/2016 | Cho | G09G 3/3677 345/99 |
| 2018/0182299 | A1 * | 6/2018 | Li | G11C 19/28 |
| 2018/0182325 | A1 * | 6/2018 | Xiong | G09G 3/36 |
| 2018/0196301 | A1 | 7/2018 | Choi et al. | |
| 2018/0350306 | A1 * | 12/2018 | Zhang | G09G 3/3233 |
| 2021/0183317 | A1 * | 6/2021 | Hu | G09G 3/3266 |
| 2021/0209987 | A1 * | 7/2021 | Feng | G09G 3/20 |
| 2022/0406252 | A1 * | 12/2022 | Feng | G09G 3/3233 |
| 2023/0335056 | A1 * | 10/2023 | Cho | G09G 3/3266 |
| 2024/0046838 | A1 * | 2/2024 | Liu | G09G 3/2007 |

FOREIGN PATENT DOCUMENTS

| | | | |
|---|---|---|---|
| CN | 104347045 | A | 2/2015 |
| CN | 107065366 | A | 8/2017 |
| CN | 108305590 | A | 7/2018 |
| CN | 108735138 | A | 11/2018 |
| CN | 112017575 | A | 12/2020 |
| CN | 112394578 | A | 2/2021 |
| CN | 112540487 | A | 3/2021 |
| KR | 20110078375 | A | 7/2011 |

OTHER PUBLICATIONS

International Search Report, mailed Aug. 4, 2022, from PCT International Application No. PCT/CN2021/131298, 4 pages.

* cited by examiner

METHOD FOR DRIVING DISPLAY PANEL, AND DISPLAY APPARATUS

CROSS-REFERENCE TO RELATED APPLICATIONS

The disclosure is a National Stage of International Application No. PCT/CN2021/131298, filed on Nov. 17, 2021, which is hereby incorporated by reference in its entirety.

TECHNICAL FIELD

The present disclosure relates to the field of display technology, and in particular, to a method for driving a display panel and a display apparatus.

BACKGROUND

A display such as a liquid crystal display (LCD) generally includes a plurality of pixels. Each pixel may include: a red sub-pixel, a green sub-pixel and a blue sub-pixel. By controlling the display data corresponding to each sub-pixel, the display brightness of each sub-pixel is controlled, so as to display the color image by mixing the required displayed colors.

SUMMARY

Embodiments of the present disclosure provide a method for driving a display panel, including:

- receiving display data of an image to be displayed in a current display frame; and
- controlling the display panel to apply a gate-on signal to gate lines in sequence, and input a voltage to data lines according to the display data;
- wherein in response to gate-on signals loaded on adjacent M gate lines having an overlapping time, during the overlapping time, a pre-charge voltage and a compensation voltage are charged to an sub-pixel electrically connected to an Mth gate line of the M gate lines in sequence; wherein M is an integer and M≥2.

In some embodiments, the method further includes: in response to the gate-on signals loaded on adjacent M gate lines having an overlapping time, after the overlapping time and during a time when the gate-on signal is applied to the Mth gate line, charging the sub-pixel electrically connected to the Mth gate line with a target voltage corresponding to the display data.

In some embodiments, the display panel includes display sub-pixels and dummy sub-pixels, the display sub-pixels are in a display area, and the dummy sub-pixels are in a non-display area surrounding the display area; and a grayscale value of a target voltage corresponding to the dummy sub-pixel adjacent to the display sub-pixel is the same as a grayscale value of a target voltage corresponding to the display sub-pixel.

In some embodiments, the display panel includes a plurality of sub-pixels of different colors, and the display data of the image to be displayed includes: display data corresponding to each sub-pixel in a one-to-one manner; and in response to a grayscale value of the display data corresponding to each sub-pixel being the same grayscale value, the pre-charge voltage, the compensation voltage and the target voltage are the same.

In some embodiments, the display panel includes a plurality of sub-pixels of different colors, and the display data of the image to be displayed includes: display data corresponding to each of the plurality of sub-pixels in a one-to-one manner; and in response to grayscale values of the display data corresponding to at least two sub-pixels being different grayscale values, the pre-charge voltage and the compensation voltage are different.

In some embodiments, for a same sub-pixel, a relationship between the pre-charge voltage VY1, the compensation voltage VB1 and the target voltage VM1 which are charged to the sub-pixel is: $VM1 \leq VB1 < VY1$.

In some embodiments, for a same sub-pixel, a relationship between the pre-charge voltage VY2, the compensation voltage VB2 and the target voltage VM2 which are charged to the sub-pixel is: $VY2 < VB2 \leq VM2$.

In some embodiments, the display panel includes display sub-pixels and dummy sub-pixels, the display sub-pixels are in a display area, and the dummy sub-pixels are in a non-display area surrounding the display area; a grayscale value of a target voltage corresponding to the dummy sub-pixel adjacent to the display sub-pixel is same as a grayscale value of a target voltage corresponding to the display sub-pixel; and a compensation voltage of the display sub-pixel adjacent to the dummy sub-pixel is same as the target voltage.

In some embodiments, the controlling of the display panel to apply the gate-on signal to the gate lines in sequence, and input the voltage to the data lines according to the display data, includes:

- for sub-pixels electrically connected to a same data line, there is a grayscale value difference between a grayscale value of the display data corresponding to the sub-pixel connected to the Mth gate line and a grayscale value of the display data corresponding to the sub-pixel connected to an (M−1)th gate line;
- determining whether the grayscale value difference is not less than a grayscale value difference threshold; and
- in response to the grayscale value difference not being less than the grayscale value difference threshold, during the overlapping time, after the sub-pixel electrically connected to the Mth gate line among the M gate lines is charged with the pre-charge voltage, inputting the compensation voltage to the data line electrically connected to the sub-pixel.

In some embodiments, the compensation voltage is triggered by a set edge of a compensation trigger signal to be input to the data line connected to a corresponding sub-pixel; and the set edge of the compensation trigger signal is one of a rising edge and a falling edge; and the set edge of the compensation trigger signal is within the overlapping time.

In some embodiments, there is a first interval duration between the set edge and a starting moment of the overlapping time, and the first interval duration is not less than 1/2 A; and

- there is a second interval duration between the set edge and an ending moment of the overlapping time, and the second interval duration is not greater than 1/2 A;
- wherein A represents a maintenance duration of the overlapping time.

In some embodiments, the target voltage is triggered by a set edge of the target trigger signal to be input to the data line connected to a corresponding sub-pixel; wherein the set edge of the target trigger signal is one of a rising edge and a falling edge; and

- the set edge of the target trigger signal is aligned with the ending moment of the overlapping time or the set edge of the target trigger signal is after the ending moment of the overlapping time.

In some embodiments, the compensation voltage is the target voltage, and the set edge of the compensation trigger signal is the set edge of the target trigger signal that triggers the target voltage.

Embodiments of the present disclosure provide a display apparatus, including:

a display panel; and a timing controller, configured to receive display data of an image to be displayed in a current display frame; and control the display panel to apply a gate-on signal to gate lines in sequence and input a voltage to data lines according to the display data; wherein in response to gate-on signals loaded on adjacent M gate lines having an overlapping time, during the overlapping time, a pre-charge voltage and a compensation voltage are charged to an sub-pixel electrically connected to an Mth gate line of the M gate lines in sequence; wherein M is an integer and M≥2.

In some embodiments, the timing controller includes a brightness correction module, configured to determine an input time of the compensation voltage and the compensation voltage according to the display data.

In some embodiments, the display panel includes:

a plurality of sub-pixels; wherein the plurality of sub-pixels are divided into a plurality of sub-pixel groups; and each of the sub-pixel groups includes two adjacent sub-pixels in a same row;

a plurality of gate lines; wherein each sub-pixel row corresponds to two gate lines; one sub-pixel in each of the sub-pixel groups is electrically connected to one of corresponding two gate lines, and the other sub-pixel in each of the sub-pixel groups is electrically connected to the other one of the corresponding two gate lines; and a plurality of data lines; wherein a column of sub-pixel groups are arranged between every two adjacent data lines; and for two adjacent data lines, one data line is electrically connected to odd-numbered rows of a column of sub-pixel groups arranged between the two adjacent data lines, and the other data line is electrically connected to even-numbered rows of the column of sub-pixel groups arranged between the two adjacent data lines.

In some embodiments, the plurality of sub-pixels include display sub-pixels and dummy sub-pixels; wherein the dummy sub-pixels are in a peripheral area of the display sub-pixels.

DETAILED DESCRIPTION

Figure 1:
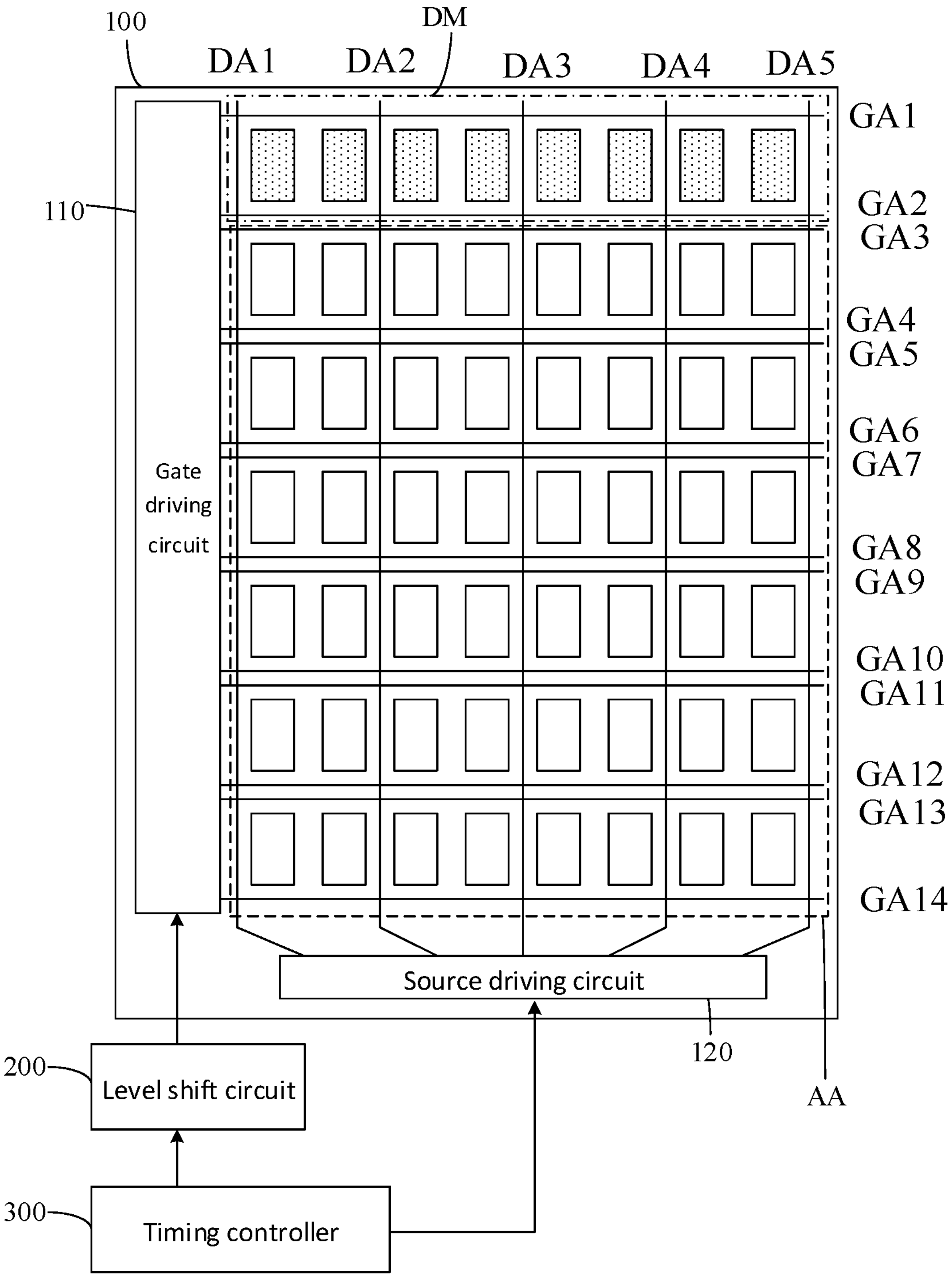
FIG. 1 is some structural schematic diagrams of a display apparatus provided by an embodiment of the present disclosure.

In order to make the purpose, technical solutions and advantages of the embodiments of the present disclosure clearer, the following will clearly and completely describe the technical solutions of the embodiments of the present disclosure in conjunction with the accompanying drawings of the embodiments of the present disclosure. Apparently, the described embodiments are some of the embodiments of the present disclosure, not all of them. And in the case of no conflict, the embodiments in the present disclosure and the features in the embodiments can be combined with each other. Based on the described embodiments of the present disclosure, all other embodiments obtained by a person of ordinary skill in the art without creative effort fall within the protection scope of the present disclosure.

Unless otherwise defined, the technical terms or scientific terms used in the present disclosure shall have the usual meanings understood by those skilled in the art to which the present disclosure belongs. “First”, “second” and similar words used in the present disclosure do not indicate any order, quantity or importance, but are only used to distinguish different components. “Comprising” or “including” and similar words mean that the elements or items appearing before the word include the elements or items listed after the word and their equivalents, without excluding other elements or items. Words such as “connected” or “connecting” are not limited to physical or mechanical connections, but may include electrical connections, whether direct or indirect.

It should be noted that the size and shape of each figure in the drawings do not reflect the actual scale, but are only intended to schematically illustrate the content of the present invention. And the same or similar reference numerals represent the same or similar elements or elements having the same or similar functions throughout.

Referring to FIG. 1, the display apparatus may include a display panel 100, a level shift circuit 200 and a timing controller 300. Herein, the display panel 100 may include a plurality of pixel units arranged in an array, a plurality of gate lines (for example, GA1, GA2, GA3, . . . GA13, GA14), a plurality of data lines (for example, DA1, DA2, DA3, DA4, DA5), a gate driving circuit 110 and a source driving circuit 120. The gate driving circuit 110 is respectively coupled to the gate lines GA1, GA2, GA3, . . . GA13, GA14, and the source driving circuit 120 is respectively coupled to the data lines DA1, DA2, DA3, DA4, DA5. Herein, the timing controller 300 inputs a control signal to the level shift circuit 200, so that the level shift circuit 200 inputs a control signal to the gate driving circuit 110, thereby driving the gate lines GA1, GA2, GA3, . . . GA13, GA14, to control the connected transistors to be turned on. The timing controller 300 inputs a signal to the source driving circuit 120, to make the source driving circuit 120 input a voltage to the data lines, so that the voltage on the data lines is input to the sub-pixels through the turned-on transistors to charge the sub-pixels, to realize the display function.

Exemplarily, each pixel unit includes a plurality of sub-pixels of different colors. For example, a pixel unit may include a red sub-pixel, a green sub-pixel and a blue sub-pixel, so that, red, green and blue colors can be mixed to achieve color display. Alternatively, a pixel unit may also include a red sub-pixel, a green sub-pixel, a blue sub-pixel and a white sub-pixel, so that color mixing can be performed through red, green, blue and white to achieve color display. Of course, in practical applications, the luminous colors of the sub-pixels in the pixel unit can be designed and determined according to the practical application environment, which is not limited here. In the following, description will be made by taking a pixel unit including a red sub-pixel, a green sub-pixel and a blue sub-pixel as an example.

In an embodiment of the present disclosure, each sub-pixel may include a transistor and a pixel electrode. Herein, each sub-pixel row can correspond to two gate lines, so that the pixel array in the present disclosure can be arranged in a double-gate structure, so as to reduce half of the data lines (that is, there is a data line between two adjacent columns of some of pixels, and there is no data line between two adjacent columns of others of pixels). Exemplarily, a first sub-pixel row corresponds to gate lines GA1 and GA2, a second sub-pixel row corresponds to gate lines GA3 and GA4, a third sub-pixel row corresponds to gate lines GA5 and GA6, a fourth sub-pixel row corresponds to gate lines GA7 and GA8, a fifth sub-pixel row corresponds to gate lines GA9 and GA10, a sixth sub-pixel row corresponds to gate lines GA11 and GA12, and a seventh sub-pixel row corresponds to gate lines GA13 and GA14.

Figure 2:
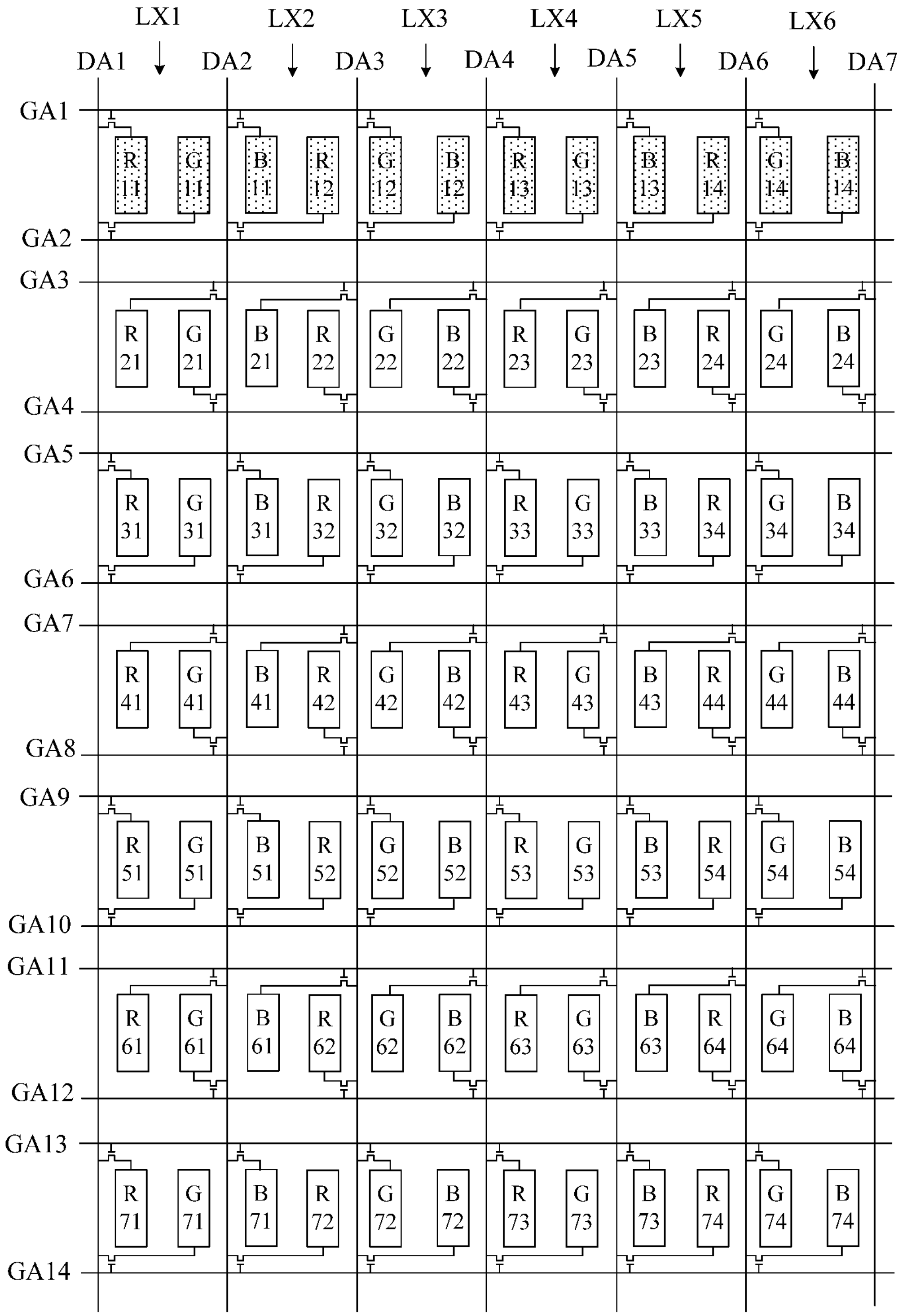
FIG. 2 is another schematic structural diagram of a display apparatus provided by an embodiment of the present disclosure.

In the embodiments of the present disclosure, a plurality of sub-pixels in the display panel can be divided into a plurality of sub-pixel groups, and each sub-pixel group can include two adjacent sub-pixels in the same row. In addition, one sub-pixel in the sub-pixel group is electrically connected to one of the corresponding two gate lines, and the other sub-pixel is electrically connected to the other of the corresponding two gate lines. Exemplarily, as shown in FIG. 2, in the first sub-pixel row, the red sub-pixel R11 and the green sub-pixel G11 are a sub-pixel group, the red sub-pixel R11 is electrically connected to the gate line GA1, and the green sub-pixel G11 is electrically connected to the gate line GA2. The blue sub-pixel B11 and the red sub-pixel R12 are a sub-pixel group, the blue sub-pixel B11 is electrically connected to the gate line GA1, and the red sub-pixel R12 is electrically connected to the gate line GA2. The green sub-pixel G12 and the blue sub-pixel B12 are a sub-pixel group, the green sub-pixel G12 is electrically connected to the gate line GA1, and the blue sub-pixel B12 is electrically connected to the gate line GA2. The red sub-pixel R13 and the green sub-pixel G13 are a sub-pixel group, the red sub-pixel R13 is electrically connected to the gate line GA1, and the green sub-pixel G13 is electrically connected to the gate line GA2. The blue sub-pixel B13 and the red sub-pixel R14 are a sub-pixel group, the blue sub-pixel B13 is electrically connected to the gate line GA1, and the red sub-pixel R14 is electrically connected to the gate line GA2. The green sub-pixel G14 and the blue sub-pixel B14 are a sub-pixel group, the green sub-pixel G14 is electrically connected to the gate line GA1, and the blue sub-pixel B14 is electrically connected to the gate line GA2. That is, a corresponding sub-pixel group in the nth row of sub-pixels is respectively connected to the (2n−1)th gate line and the (2n)th gate line, two sub-pixels included in a sub-pixel group are connected to the same data line, and two adjacent rows of sub-pixels corresponding to the same column of sub-pixel group are connected to two adjacent data lines, for example, R11 and G11 are connected to DA1, and R21 and G21 are connected to DA2.

Moreover, in the second sub-pixel row, the red sub-pixel R21 and the green sub-pixel G21 are a sub-pixel group, the red sub-pixel R21 is electrically connected to the gate line GA3, and the green sub-pixel G21 is electrically connected to the gate line GA4. The blue sub-pixel B21 and the red sub-pixel R22 are a sub-pixel group, the blue sub-pixel B21 is electrically connected to the gate line GA3, and the red sub-pixel R22 is electrically connected to the gate line GA4. The green sub-pixel G22 and the blue sub-pixel B22 are a sub-pixel group, the green sub-pixel G22 is electrically connected to the gate line GA3, and the blue sub-pixel B22 is electrically connected to the gate line GA4. The red sub-pixel R23 and the green sub-pixel G23 are a sub-pixel group, the red sub-pixel R23 is electrically connected to the gate line GA3, and the green sub-pixel G23 is electrically connected to the gate line GA4. The blue sub-pixel B23 and the red sub-pixel R24 are a sub-pixel group, the blue sub-pixel B23 is electrically connected to the gate line GA3, and the red sub-pixel R24 is electrically connected to the gate line GA4. The green sub-pixel G24 and the blue sub-pixel B24 are a sub-pixel group, the green sub-pixel G24 is electrically connected to the gate line GA3, and the blue sub-pixel B24 is electrically connected to the gate line GA4. The rest of the sub-pixel rows are similarly divided into sub-pixel groups, which will not be repeated here.

Figure 3:
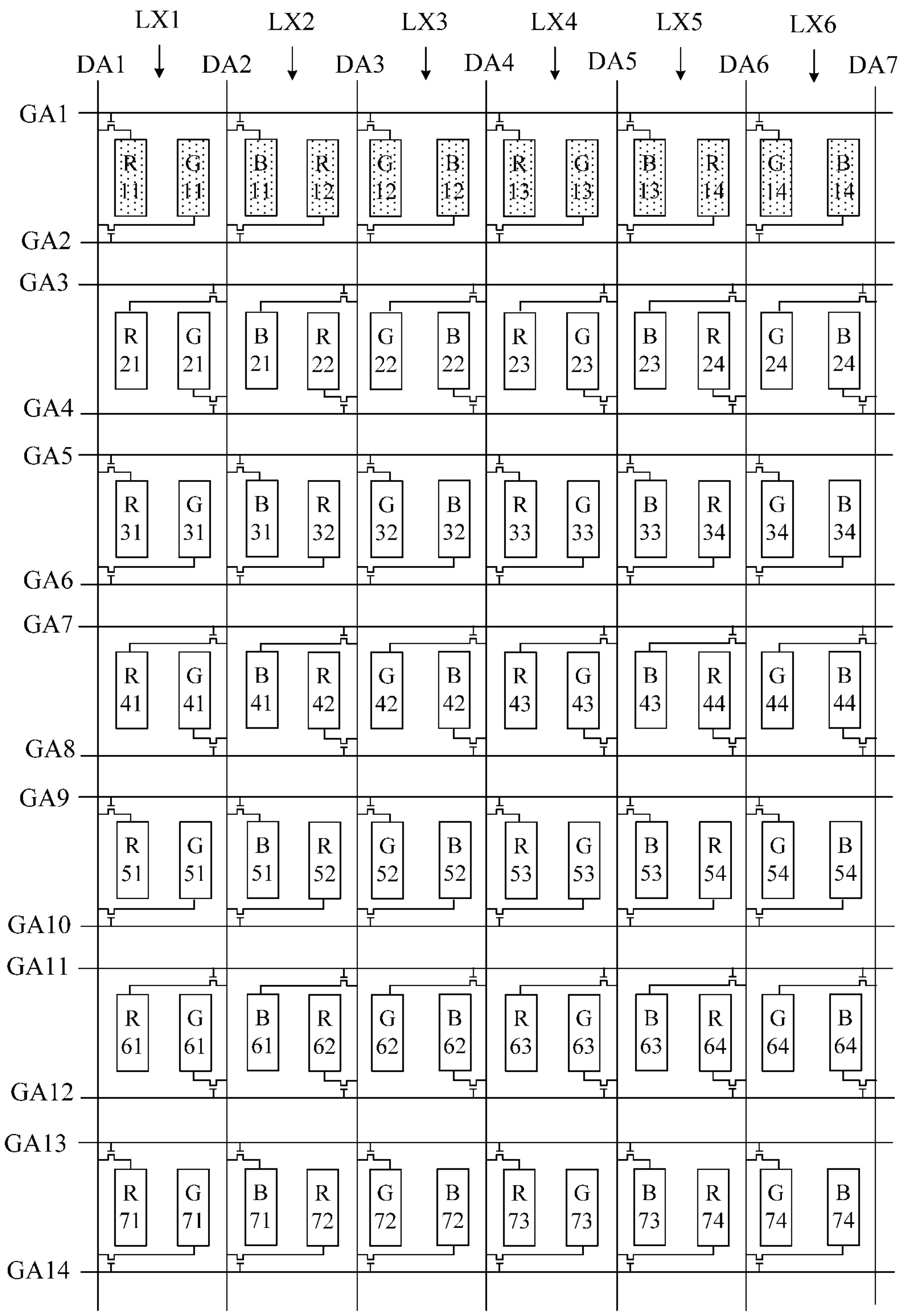
FIG. 3 is yet another structural schematic diagram of a display apparatus provided by an embodiment of the present disclosure.

Exemplarily, as shown in FIG. 3, in the first sub-pixel row, the red sub-pixel R11 and the green sub-pixel G11 are a sub-pixel group, the red sub-pixel R11 is electrically connected to the gate line GA1, and the green sub-pixel G11 is electrically connected to the gate line GA2. The blue sub-pixel B11 and the red sub-pixel R12 are a sub-pixel group, the blue sub-pixel B11 is electrically connected to the gate line GA1, and the red sub-pixel R12 is electrically connected to the gate line GA2. The green sub-pixel G12 and the blue sub-pixel B12 are a sub-pixel group, the green sub-pixel G12 is electrically connected to the gate line GA1, and the blue sub-pixel B12 is electrically connected to the gate line GA2. The red sub-pixel R13 and the green sub-pixel G13 are a sub-pixel group, the red sub-pixel R13 is electrically connected to the gate line GA1, and the green sub-pixel G13 is electrically connected to the gate line GA2. The blue sub-pixel B13 and the red sub-pixel R14 are a sub-pixel group, the blue sub-pixel B13 is electrically connected to the gate line GA1, and the red sub-pixel R14 is electrically connected to the gate line GA2. The green sub-pixel G14 and the blue sub-pixel B14 are a sub-pixel group, the green sub-pixel G14 is electrically connected to the gate line GA1, and the blue sub-pixel B14 is electrically connected to the gate line GA2.

Moreover, in the second sub-pixel row, the red sub-pixel R21 and the green sub-pixel G21 are a sub-pixel group, the red sub-pixel R21 is electrically connected to the gate line GA3, and the green sub-pixel G21 is electrically connected to the gate line GA4. The blue sub-pixel B21 and the red sub-pixel R22 are a sub-pixel group, the blue sub-pixel B21 is electrically connected to the gate line GA3, and the red sub-pixel R22 is electrically connected to the gate line GA4. The green sub-pixel G22 and the blue sub-pixel B22 are a sub-pixel group, the green sub-pixel G22 is electrically connected to the gate line GA3, and the blue sub-pixel B22 is electrically connected to the gate line GA4. The red sub-pixel R23 and the green sub-pixel G23 are a sub-pixel group, the red sub-pixel R23 is electrically connected to the gate line GA3, and the green sub-pixel G23 is electrically connected to the gate line GA4. The blue sub-pixel B23 and the red sub-pixel R24 are a sub-pixel group, the blue sub-pixel B23 is electrically connected to the gate line GA3, and the red sub-pixel R24 is electrically connected to the gate line GA4. The green sub-pixel G24 and the blue sub-pixel B24 are a sub-pixel group, the green sub-pixel G24 is electrically connected to the gate line GA3, and the blue sub-pixel B24 is electrically connected to the gate line GA4. The rest of the sub-pixel rows are similarly divided into sub-pixel groups, which will not be repeated here.

In the embodiment of the present disclosure, a column of sub-pixel groups can be arranged between every two adjacent data lines; and for two adjacent data lines, one data line is connected to the odd-numbered rows of a column of sub-pixel groups between the two adjacent data lines, and the other data line is connected to the even-numbered rows of a column of sub-pixel groups arranged between the two adjacent data lines. In other words, two adjacent columns of sub-pixels are arranged between two adjacent data lines. This can reduce the power consumption of the source driving circuit. Exemplarily, as shown in FIG. 2 and FIG. 3, the first column of sub-pixel groups LX1 are arranged between the data lines DA1 and DA2, the second column of sub-pixel groups LX2 are arranged between the data lines DA2 and DA3, the third column of sub-pixel groups LX3 are arranged between the data lines DA3 and DA4, the fourth column of sub-pixel groups LX4 are arranged between the data lines DA4 and DA5, the fifth column of sub-pixel groups LX5 are arranged between the data lines DA5 and DA6, and the sixth column of sub-pixel groups LX6 are arranged between the data lines DA6 and DA7.

For the first column of sub-pixel groups LX1: the data line DA1 is electrically connected to the odd-numbered rows of the first column of sub-pixel groups LX1 (that is, the red sub-pixel R11 and the green sub-pixel G11 in the first row; the red sub-pixel R31 and the green sub-pixel G31 in the third row; the red sub-pixel R51 and the green sub-pixel G51 in the fifth row; and the red sub-pixel R71 and the green sub-pixel G71 in the seventh row); and the data line DA2 is electrically connected to the even-numbered rows of the first column of sub-pixel groups LX1 (that is, the red sub-pixel R21 and the green sub-pixel G21 in the second row; the red sub-pixel R41 and the green sub-pixel G41 in the fourth row; and the red sub-pixel R61 and the green sub-pixel G61 in the sixth row).

For the second column of sub-pixel groups LX2: the data line DA2 is electrically connected to the odd-numbered rows of the second column of sub-pixel groups LX2 (that is, the blue sub-pixel B11 and the red sub-pixel R12 in the first row; the blue sub-pixel B31 and the red sub-pixel R32 in the third row; the blue sub-pixel B51 and the red sub-pixel R52 in the fifth row; and the blue sub-pixel B71 and the red sub-pixel R72 in the seventh row); and the data line DA3 is electrically connected to the even-numbered rows of the second column of sub-pixel groups LX2 (that is, the blue sub-pixel B21 and the red sub-pixel R22 in the second row; the blue sub-pixel B41 and the red sub-pixel R42 in the fourth row; and the blue sub-pixel B61 and the red sub-pixel R62 in the sixth row).

The rest of the sub-pixel groups are similarly connected to the data lines, which will not be repeated here.

Figure 4:
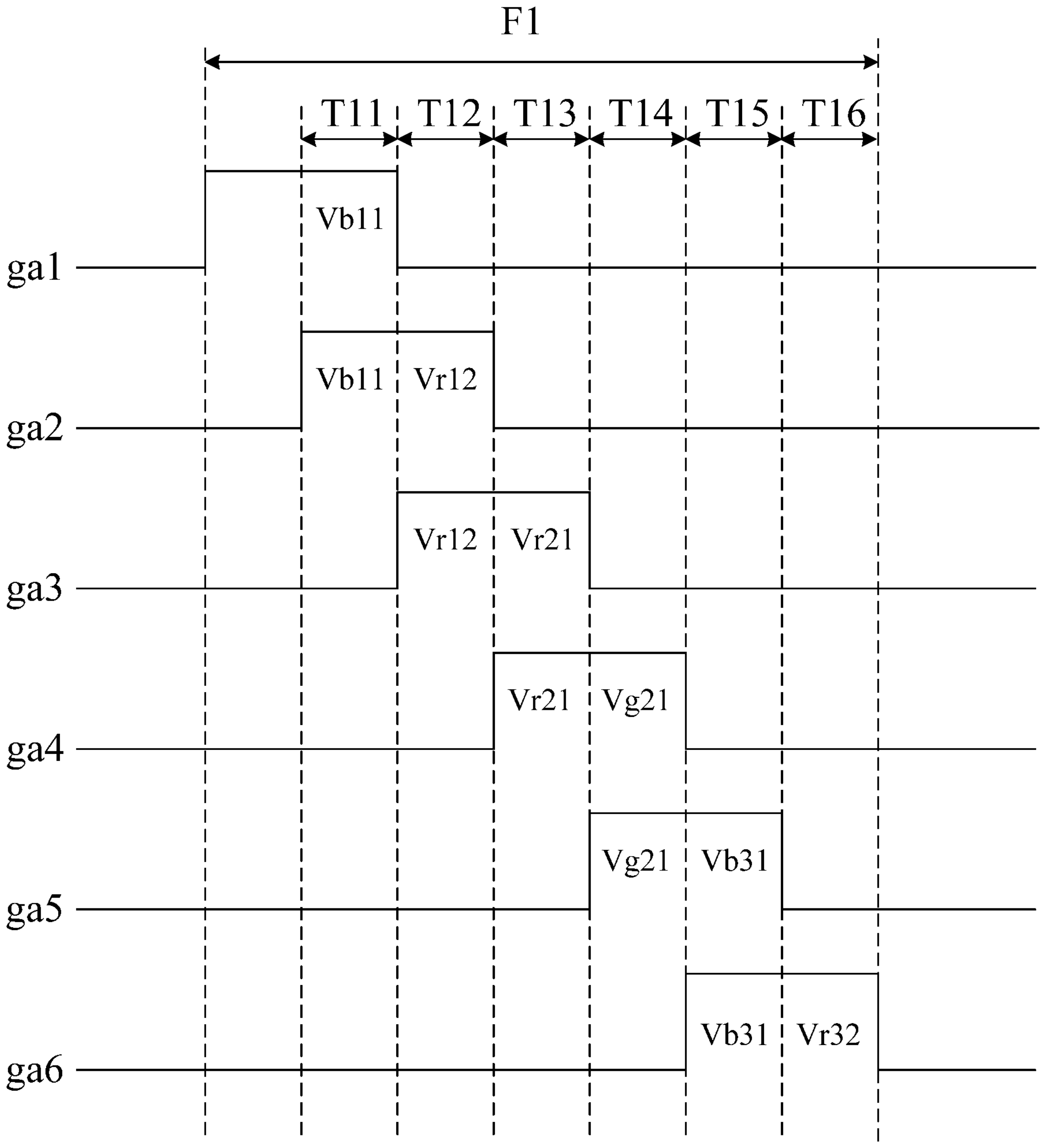
FIG. 4 is some timing diagrams of signals provided by an embodiment of the present disclosure.

Taking the structure of the display panel shown in FIG. 2 as an example, FIG. 4 is a timing diagram of some signals provided by an embodiment of the present disclosure. Herein, ga1 represents the signal loaded on the gate line GA1, ga2 represents the signal loaded on the gate line GA2, ga3 represents the signal loaded on the gate line GA3, . . . ga13 represents the signal loaded on the gate line GA13, and ga14 represents the signal loaded on the gate line GA14. For example, the high level of the signals ga1-ga14 can be used as a gate-on signal to control the transistors in the sub-pixels to be turned on. Referring to FIG. 2 and FIG. 4, when controlling the drive of the display panel, the gate-on signals may be sequentially applied to the gate lines GA1-GA14. Taking the gate lines GA1-GA6, the data line DA2, and the sub-pixels connected to the data line DA2 as an example, in the display frame F1, when the signal ga1 on the first gate line GA1 outputs a high-level gate-on signal, the transistor in the blue sub-pixel B11 is turned on. In the time period T11 corresponding to the high level of the signal ga1, the data voltage Vb11 of the display data corresponding to the blue sub-pixel B11 is input to the data line DA2, so that the blue sub-pixel B11 is charged with the data voltage Vb11. In the time period T11, the signal ga2 on the second gate line GA2 outputs a high-level gate-on signal, and the transistor in the red sub-pixel R12 is turned on. The data voltage Vb11 is simultaneously input into the red sub-pixel R12 to pre-charge the red sub-pixel R12, that is, Vb11 is used as the pre-charge voltage of the red sub-pixel R12.

In the time period T12 corresponding to the high level of the signal ga2, the data voltage Vr12 of the display data corresponding to the red sub-pixel R12 is input to the data line DA2, so that the red sub-pixel R12 is charged with the data voltage Vr12. In the time period T12, the signal ga3 on the third gate line GA3 outputs a high-level gate-on signal, and the transistor in the red sub-pixel R21 is turned on. The data voltage Vr12 is simultaneously input into the red sub-pixel R21 to pre-charge the red sub-pixel R21, that is, Vr12 is used as the pre-charge voltage of the red sub-pixel R21.

In the time period T13 corresponding to the high level of the signal ga3, the data voltage Vr21 of the display data corresponding to the red sub-pixel R21 is input to the data line DA2, so that the red sub-pixel R21 is charged with the data voltage Vr21. In the time period T13, the signal ga4 on the fourth gate line GA4 outputs a high-level gate-on signal, and the transistor in the green sub-pixel G21 is turned on. The data voltage Vr21 is simultaneously input into the green sub-pixel G21 to pre-charge the green sub-pixel G21, that is, Vr21 serves as the pre-charge voltage of the green sub-pixel G21.

In the time period T14 corresponding to the high level of the signal ga4, the data voltage Vg21 of the display data corresponding to the green sub-pixel G21 is input to the data line DA2, so that the green sub-pixel G21 is charged with the data voltage Vg21. In the time period T14, the signal ga5 on the fifth gate line GA5 outputs a high-level gate-on signal, and the transistor in the blue sub-pixel B31 is turned on. The data voltage Vg21 is simultaneously input into the blue sub-pixel B31 to pre-charge the blue sub-pixel B31, that is, Vg21 is used as the pre-charge voltage of the blue sub-pixel B31.

In the time period T15 corresponding to the high level of the signal ga5, the data voltage Vb31 of the display data corresponding to the blue sub-pixel B31 is input to the data line DA2, so that the blue sub-pixel B31 is charged with the data voltage Vb31. In the time period T15, the signal ga6 on the sixth gate line GA6 outputs a high-level gate-on signal, and the transistor in the red sub-pixel R32 is turned on. The data voltage Vb31 is simultaneously input into the red sub-pixel R32 to pre-charge the red sub-pixel R32, that is, Vb31 is used as the pre-charge voltage of the red sub-pixel R32.

The implementation manners of the remaining sub-pixels are deduced in turn until the sub-pixels in the entire display panel are charged with the target voltage, which will not be repeated here.

During the driving process of the above-mentioned display panel, the voltage charged in the red sub-pixel R12 jumps directly from Vb11 to Vr12, and the voltage charged in the red sub-pixel R21 jumps directly from Vr12 to Vr21, for example, jumping directly from the voltage corresponding to the grayscale value of 127 to the voltage corresponding to the grayscale value of 255, resulting in different charging rates, thereby causing abnormal brightness, which in turn affects the display quality of the screen.

Based on this, an embodiment of the present disclosure provides a method for driving a display panel. When the gate-on signals loaded to adjacent M gate lines have an overlapping time, during the overlapping time, the sub-pixel electrically connected to the Mth gate line in the M gate lines is charged with the pre-charge voltage and the compensation voltage in sequence; and when the target voltage is charged to the sub-pixel electrically connected to the Mth gate line, the pre-charge voltage in the sub-pixel can be switched to the compensation voltage first, and then the compensation voltage is switched to the target voltage, so as to increase the charging rate, improve the brightness abnormality, and improve the picture display quality.

Figure 5:
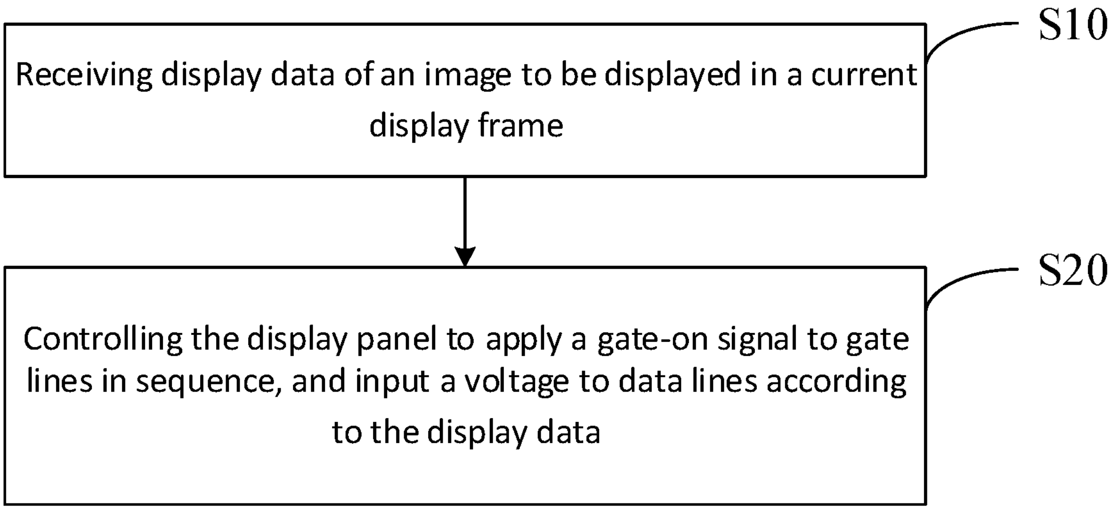
FIG. 5 is some flowcharts of a driving method provided by the embodiment of the present disclosure.

The method for driving the display panel provided by the embodiment of the present disclosure, as shown in FIG. 5, may include:

S10. receiving display data of an image to be displayed in a current display frame; and S20. controlling the display panel to apply a gate-on signal to gate lines in sequence, and input a voltage to data lines according to the display data.

In the embodiment of the present disclosure, when the gate-on signals loaded on adjacent M gate lines have an overlapping time, within the overlapping time, the sub-pixels electrically connected to the Mth gate line among the M gate lines are charged with the pre-charge voltage and the compensation voltage in sequence. After the overlapping time and during the time when the Mth gate line is loaded with the gate-on signal, the sub-pixels electrically connected to the Mth gate line are charged with the target voltage corresponding to the display data. Herein, the target voltage refers to the data voltage of the display data corresponding to the sub-pixel.

Figure 6A:
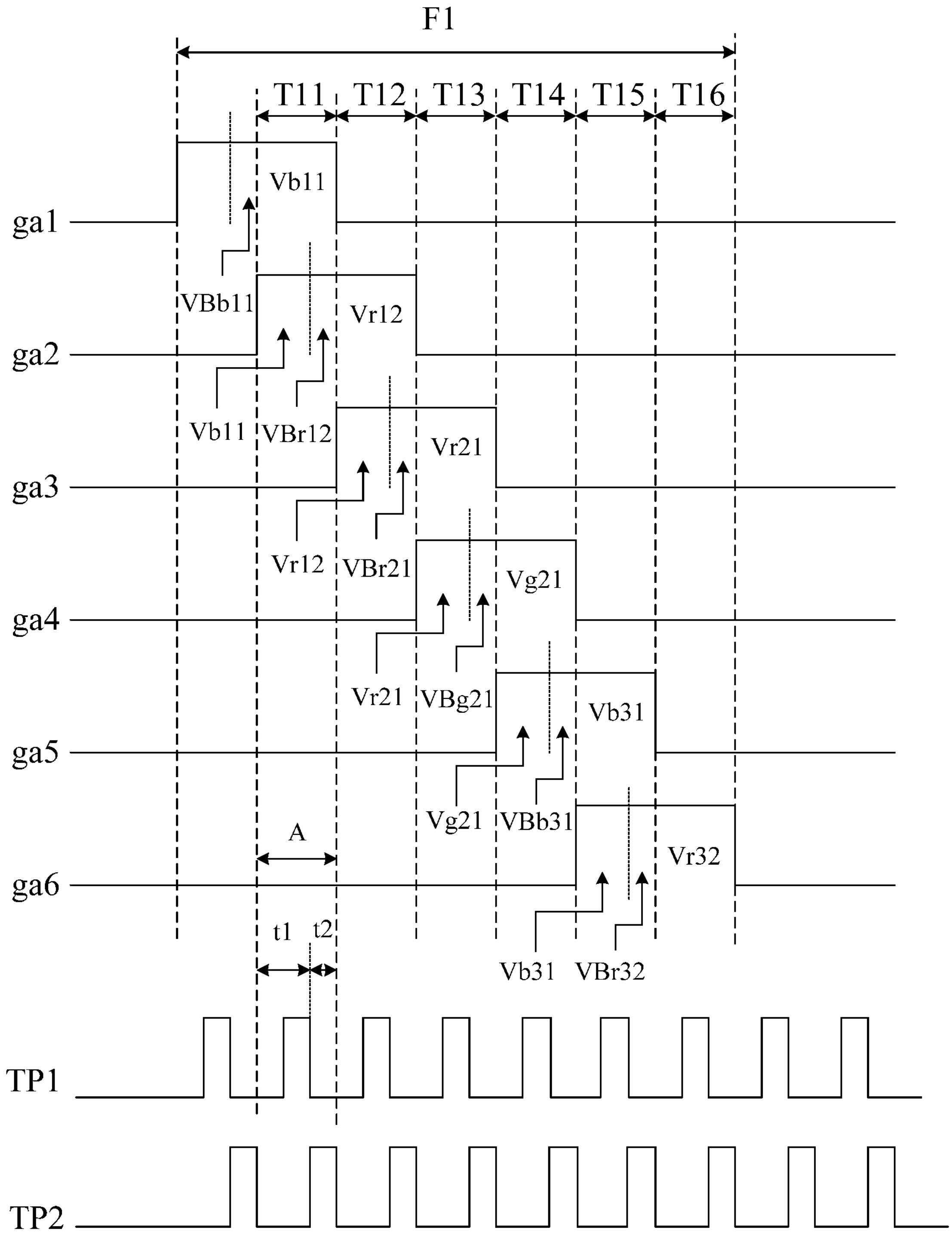
FIG. 6A is some timing diagrams of signals provided by an embodiment of the present disclosure.

In the embodiment of the present disclosure, as shown in FIG. 6A, M=2, so that there is an overlapping time between the gate-on signals loaded on two adjacent gate lines, and in the overlapping time, the sub-pixels electrically connected to the second gate line among the two adjacent gate lines are charged with the pre-charge voltage, the compensation voltage and the target voltage in sequence. The image to be displayed can be displayed after each sub-pixel is charged with the target voltage. Exemplarily, taking the high level of the gate-on signal as an example, there is an overlapping time T11 between the high level of the signal ga1 of the first gate line GA1 and the high level of the signal ga2 of the second gate line GA2; and then the second gate line GA2 can be used as the second of two overlapping gate lines, and the first gate line GA1 can be used as the first of two overlapping gate lines. There is an overlapping time T12 between the high level of the signal ga2 of the second gate line GA2 and the high level of the signal ga3 of the third gate line GA3; and then the third gate line GA3 can be used as the second of two overlapping gate lines, and the second gate line GA2 is used as the first of two overlapping gate lines. There is an overlapping time T13 between the high level of the signal ga3 of the third gate line GA3 and the high level of the signal ga4 of the fourth gate line GA4; and then the fourth gate line GA4 can be used as the second of two gate lines, and the third gate line GA3 is used as the first of two overlapping gate lines. There is an overlapping time T14 between the high level of the signal ga4 of the fourth gate line GA4 and the high level of the signal ga5 of the fifth gate line GA5, and then the fifth gate line GA5 can be used as the second of two overlapping gate lines, and the fourth gate line GA4 is used as the first of two overlapping gate lines. There is an overlapping time T15 between the high level of the signal ga5 of the fifth gate line GA5 and the high level of the signal ga6 of the sixth gate line GA6, and then the sixth gate line GA6 can be used as the second of two overlapping gate lines, and the fifth gate line GA5 is used as the first of two overlapping gate lines.

Figure 6B:
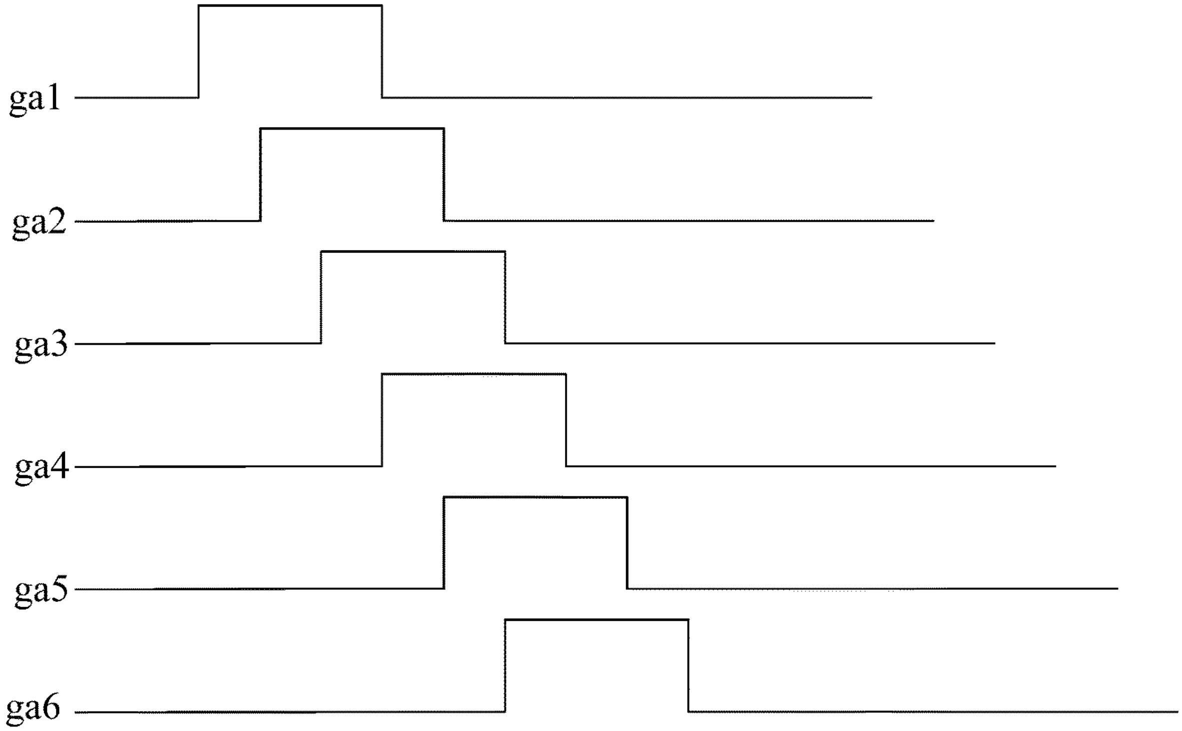
FIG. 6B is another timing diagram of signals provided by an embodiment of the present disclosure.

In the embodiment of the present disclosure, as shown in FIG. 6B, M=3, so that there is an overlapping time between the gate-on signals loaded on three adjacent gate lines, and during the overlapping time, the sub-pixels electrically connected to the third gate line among the three gate lines are charged with the pre-charge voltage, the compensation voltage and the target voltage in sequence. The image to be displayed can be displayed after each sub-pixel is charged with the target voltage. Exemplarily, taking the high level of the gate-on signal as an example, there is an overlapping time between the high level of the signal ga1 of the first gate line GA1, the high level of the signal ga2 of the second gate line GA2, and the high level of the signal ga3 of the third gate line GA3; and then the third gate line GA3 can be used as the third of three overlapping gate lines. The rest are similar, and so on, which will not be repeated here.

Figure 6C:
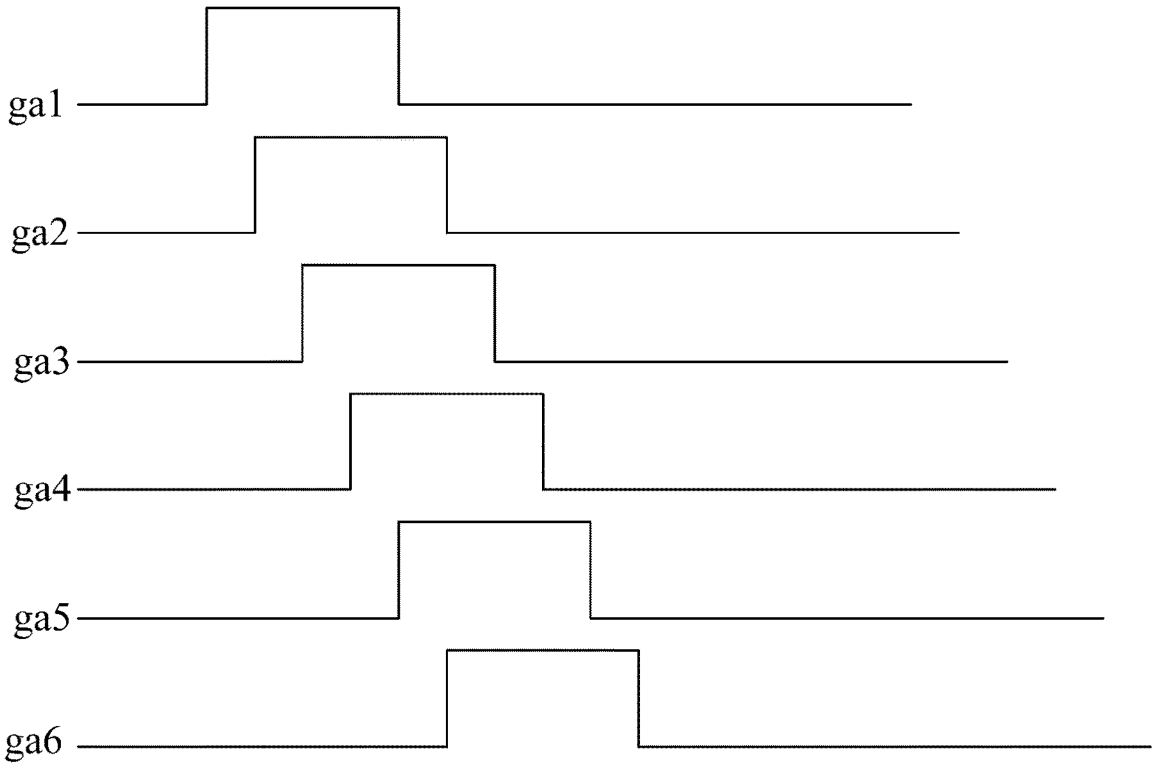
FIG. 6C is yet another timing diagram of signals provided by an embodiment of the present disclosure.

In the embodiment of the present invention, as shown in FIG. 6C, M=4, so that there is an overlapping time between the gate-on signals loaded on four adjacent gate lines, and during the overlapping time, the sub-pixels electrically connected to the fourth gate line among the four gate lines are charged with the pre-charge voltage, the compensation voltage and the target voltage in sequence. The image to be displayed can be displayed after each sub-pixel is charged with the target voltage. Exemplarily, taking the high level of the gate-on signal as an example, there is an overlapping time between the high level of the signal ga1 of the first gate line GA1, the high level of the signal ga2 of the second gate line GA2, the high level of the signal ga3 of the third gate line GA3 and the high level of the signal ga4 of the fourth gate line GA4, and then the fourth gate line GA4 can be used as the fourth of the four overlapping gate lines. The rest are similar, and so on, which will not be repeated here.

Of course, M can be set to 5, 6 or greater, which can be designed and determined according to the requirements of practical applications, and is not limited here.

In order to improve the display quality of the picture, dummy sub-pixels can be set in the non-display area of the display panel. Exemplarily, in the embodiment of the present disclosure, as shown in FIG. 1 to FIG. 3, the sub-pixels with shadows in the display panel can be used as dummy sub-pixels, and the rest of the sub-pixels can be used as display sub-pixels. The dummy sub-pixels are located on the peripheral area of the display sub-pixels. That is, the area where the display sub-pixels are located is the display area AA. The area on the substrate other than the display area AA can be a non-display area. The gate driving circuit 110 and the source driving circuit 120 can be arranged in the non-display area. The dummy sub-pixels may be in the dummy area DM of the non-display area. As shown in FIG. 2 and FIG. 3, all sub-pixels in the first row may be used as dummy sub-pixels. That is, all sub-pixels in the first row are disposed in the dummy area DM. Alternatively, all sub-pixels in the first row and the second row may be used as dummy sub-pixels. That is, all sub-pixels in the first row and the second row are disposed in the dummy area DM. Certainly, in practical applications, the number of dummy sub-pixels may be set according to requirements of practical applications, which is not limited here.

In the following, taking M=2, the data line DA2 and the first row of sub-pixels set as dummy sub-pixels for an example.

Combining FIG. 2 and FIG. 6A, there is an overlapping time between the gate-on signal in the signal ga1 of the first gate line GA1 and the gate-on signal in the signal ga2 of the second gate line GA2, and the overlapping time is the time period T11. The pre-charge voltage Vb11 and the compensation voltage VBr12 may be sequentially charged to the red sub-pixel R12 during the time period T11. During the time period T12, the red sub-pixel R12 is charged with the target voltage Vr12.

There is an overlapping time between the gate-on signal in the signal ga2 of the second gate line GA2 and the gate-on signal in the signal ga3 of the third gate line GA3, and the overlapping time is the time period T12. During the time period T12, the red sub-pixel R21 is charged with the pre-charge voltage Vr12 and the compensation voltage VBr21 in sequence. During the time period T13, the red sub-pixel R21 is charged with the target voltage Vr21.

There is an overlapping time between the gate-on signal in the signal ga3 of the third gate line GA3 and the gate-on signal in the signal ga4 of the fourth gate line GA4, and the overlapping time is the time period T13. During the time period T13, the green sub-pixel G21 is charged with the pre-charge voltage Vr21 and the compensation voltage VBg21 in sequence. During the time period T14, the green sub-pixel G21 is charged with the target voltage Vg21.

There is an overlapping time between the gate-on signal in the signal ga4 of the fourth gate line GA4 and the gate-on signal in the signal ga5 of the fifth gate line GA5, and the overlapping time is the time period T14. During the time period T14, the blue sub-pixel B31 is charged with the pre-charge voltage Vg21 and the compensation voltage VBb31 sequentially. During the time period T15, the blue sub-pixel B31 is charged with the target voltage Vb31.

There is an overlapping time between the gate-on signal in the signal ga5 of the fifth gate line GA5 and the gate-on signal in the signal ga6 of the sixth gate line GA6, and the overlapping time is the time period T15. During the time period T15, the red sub-pixel R32 is charged with the pre-charge voltage Vb31 and the compensation voltage VBr32 in sequence. During the time period T16, the red sub-pixel R32 is charged with the target voltage Vr32.

The implementation manners of the remaining sub-pixels are deduced in turn until the sub-pixels in the entire display panel are charged with the target voltage, which will not be repeated here.

Figure 7:
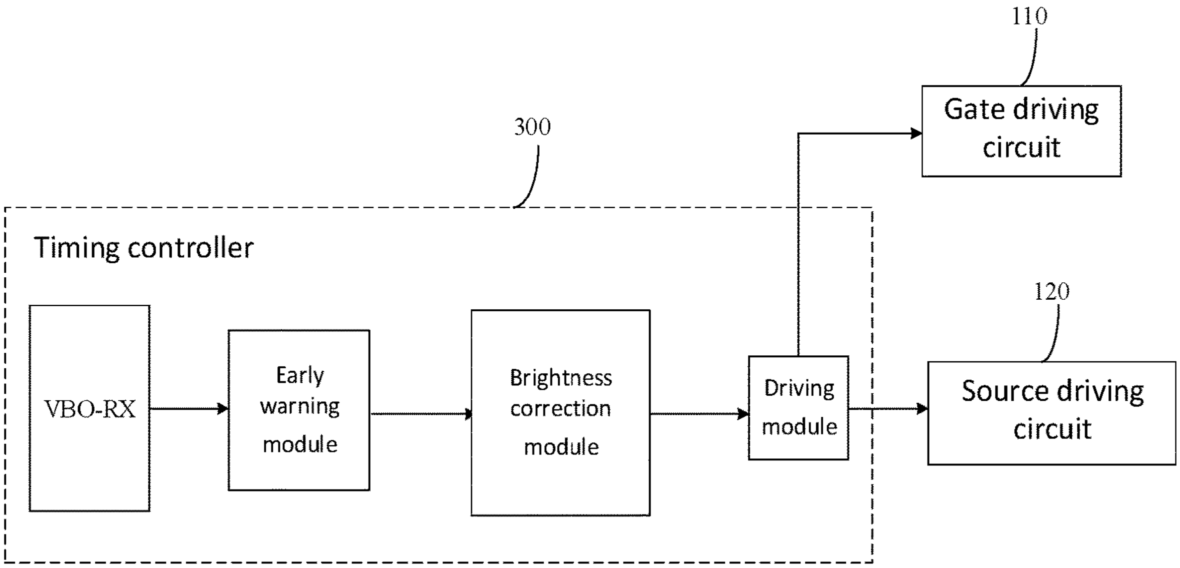
FIG. 7 is a schematic diagram of a timing controller, a gate driving circuit and a source driving circuit provided by an embodiment of the present disclosure.

In the embodiment of the present disclosure, as shown in FIG. 7, the V-By-One receiving end VBO-RX of the timing controller 300 can receive the display data of the image to be displayed in the current display frame, and input the display data in the form of binary digital voltage signal into the early warning module. The early warning module can judge whether the received display data is normal. If it is not normal, then the display data corresponding to the reminder picture (the reminder picture can be a red solid color picture or a green solid color picture or a blue solid color picture) is output to the brightness correction module. If it is normal, then the received display data is directly output to the brightness correction module. In this way, the input time of the compensation voltage and the compensation voltage can be determined by the brightness correction module in the timing controller 300 according to the received display data. In this way, the driving module in the timing controller 300 outputs control signals to the gate driving circuit 110 and the source driving circuit 120 in the display panel according to the display data output by the brightness correction module and the determined input time of the compensation voltage and compensation voltage, to control the display panel to sequentially apply a gate-on signal to the gate lines, convert the display data from a digital voltage signal to an analog voltage signal, and then input a voltage to the data lines. Therefore, when the gate-on signals loaded on adjacent M gate lines have an overlapping time, during the overlapping time, the sub-pixels electrically connected to the Mth gate line among the M gate lines are sequentially charged with the pre-charge voltage and the compensation voltage. After the overlapping time and during the time when the Mth gate line is loaded with the gate-on signal, the sub-pixels electrically connected to the Mth gate line are charged with the target voltage corresponding to the display data.

In some examples, the display data of the image to be displayed may include: display data corresponding to each sub-pixel in a one-to-one manner. The grayscale value of the target voltage corresponding to the dummy sub-pixel adjacent to the display sub-pixel can be the same as the grayscale value of the target voltage corresponding to the display sub-pixel. In this way, the grayscale value of the dummy sub-pixel adjacent to the display sub-pixel can follow the display sub-pixel, that is, the grayscale value of the display sub-pixel is the same as the grayscale value of dummy sub-pixel adjacent to the display sub-pixel. For example, taking the first row of sub-pixels as dummy sub-pixels and the second row of sub-pixels as display sub-pixels, the grayscale value of the target voltage of the red sub-pixel R11 is the same as the grayscale value of the target voltage of the red sub-pixel R21, the grayscale value of the target voltage of the green sub-pixel G11 is the same as the grayscale value of the target voltage of the green sub-pixel G21, and the grayscale value of the target voltage of the blue sub-pixel B11 is the same as the grayscale value of the target voltage of the blue sub-pixel B21. The grayscale value of the target voltage of the red sub-pixel R12 is the same as the grayscale value of the target voltage of the red sub-pixel R22, the grayscale value of the target voltage of the green sub-pixel G12 is the same as the grayscale value of the target voltage of the green sub-pixel G22, and the grayscale value of the target voltage of the blue sub-pixel B12 is the same as the grayscale value of the target voltage of the blue sub-pixel B22. The grayscale value of the target voltage of the red sub-pixel R13 is the same as the grayscale value of the target voltage of the red sub-pixel R23, the grayscale value of the target voltage of the green sub-pixel G13 is the same as the grayscale value of the target voltage of the green sub-pixel G23, and the grayscale value of the target voltage of the blue sub-pixel B13 is the same as the grayscale value of the target voltage of the blue sub-pixel B23. The grayscale value of the target voltage of the red sub-pixel R14 is the same as the grayscale value of the target voltage of the red sub-pixel R24, the grayscale value of the target voltage of the green sub-pixel G14 is the same as the grayscale value of the target voltage of the green sub-pixel G24, and the grayscale value of the target voltage of the blue sub-pixel B14 is the same as the grayscale value of the target voltage of the blue sub-pixel B24.

In some examples, if the sub-pixels in the first row and the second row are dummy sub-pixels, and the sub-pixels in the third row are display sub-pixels, in the same column of sub-pixels, the grayscale value of the target voltage corresponding to the sub-pixels in the second row can be the same as the grayscale value of the target voltage corresponding to the sub-pixels in the third row. The grayscale value of each sub-pixel in the first row can be set as a fixed grayscale value.

In some examples, when the grayscale value of the display data corresponding to each sub-pixel is the same grayscale value, the pre-charge voltage, the compensation voltage and the target voltage can be the same. In this way, the difficulty of determining the compensation voltage can be reduced, and the amount of calculation can be reduced.

Taking the display panel with grayscale values from 0 to 255 as an example, for example, the sub-pixels in the first row are dummy sub-pixels. In the related art, the grayscale value of the display data corresponding to the dummy sub-pixels is usually set to a fixed value, such as a fixed grayscale value 127. When the picture to be displayed is the picture with the same grayscale value (that is, a pure grayscale picture), displaying a picture of grayscale value 64 is taken as an example. In this case, taking the sub-pixel connected to the third grate line being the red sub-pixel R21 as an example, the pre-charge voltage of the red sub-pixel R21 is the voltage corresponding to the grayscale value 127, and then the red sub-pixel R21 is charged with the target voltage of the grayscale value 64. In the sub-pixels from the third row to the seventh row, the pre-charge voltage of the red sub-pixels is the voltage corresponding to grayscale value 64, and then the red sub-pixels are charged with the target voltage of grayscale value 64, that is, the voltage of the first row of sub-pixel jumps from the pre-charge voltage of grayscale value 127 to the target voltage of grayscale value 64, while the other rows of sub-pixels still change from the pre-charge voltage of grayscale value 64 to the target voltage of grayscale value 64. As a result, the brightness of the sub-pixels in the second row is higher, and there is a difference between the brightness of the second row and the brightness of other display rows, resulting in the problem of uneven display. In the embodiment of the present disclosure, by setting the grayscale value of the corresponding display data of each sub-pixel to the same grayscale value, the display data of the sub-pixels in the first row can be the same as the display data of the sub-pixels in the second row. Taking the red sub-pixel R21 as an example, the pre-charge voltage, the compensation voltage and the target voltage charged to the red sub-pixel R21 are voltages corresponding to the grayscale value 64. In the sub-pixels of the third row to the seventh row, the pre-charge voltage, the compensation voltage and the target voltage charged to the red sub-pixels are also voltages corresponding to the grayscale value 64. In this way, the uniformity of the charging rate of the sub-pixels in the second row to the seventh row can be improved, and the uniformity of brightness can also be improved. Since the sub-pixels in the first row are dummy sub-pixels, which do not need to display an image, and the brightness uniformity of the sub-pixels in the second to seventh rows for display is improved, thus the image can be displayed normally. That is, in the embodiment of the present disclosure, by setting the target voltage corresponding to the grayscale value of the dummy sub-pixel row to be the same as the target voltage corresponding to the grayscale value of the adjacent display sub-pixel row, the pre-charge voltage, the compensation voltage and the target voltage of the display sub-pixel row are all equal, to realize the uniform display effect of the pure grayscale image; herein the specific target voltage corresponding to the equal grayscale value can be set according to the display sub-pixel row.

Of course, in order to reduce the calculation amount and power consumption of the timing controller, the compensation voltage may be first input to the sub-pixels connected to the first gate line, and then the target voltage may be input.

Exemplarily, taking the display panel with grayscale values from 0 to 255 as an example, when the grayscale value of the display data corresponding to each sub-pixel is grayscale value 64, the image to be displayed can be a frame with a pure grayscale value. Combined with FIG. 2 and FIG. 6A, before the time period T11, the blue sub-pixel B11 can be charged with the compensation voltage VBb11. During the time period T11, the target voltage Vb11 charged to the blue sub-pixel B11 is the voltage corresponding to grayscale value 64. The pre-charge voltage Vb11 and the compensation voltage VBr12 charged to the red sub-pixel R12 in sequence during the time period T11, and the target voltage Vr12 charged to the red sub-pixel R12 during the time period T12 are a voltage corresponding to the grayscale value 64. The pre-charge voltage Vr12 and the compensation voltage VBr21 charged to the red sub-pixel R21 sequentially during the time period T12, and the target voltage Vr21 charged to the red sub-pixel R21 during the time period T13 are a voltage corresponding to the grayscale value 64. The pre-charge voltage Vr21 and the compensation voltage VBg21 charged to the green sub-pixel G21 sequentially during the time period T13, and the target voltage Vg21 charged to the green sub-pixel G21 during the time period T14 are a voltage corresponding to the grayscale value 64. The pre-charge voltage Vg21 and the compensation voltage VBb31 charged to the blue sub-pixel B31 sequentially during the time period T14, and the target voltage Vb31 charged to the blue sub-pixel B31 during the time period T15 are a voltage corresponding to the grayscale value 64. The pre-charge voltage Vb31 and the compensation voltage VBr32 charged to the red sub-pixel R32 sequentially during the time period T15, and the target voltage Vr32 charged to the red sub-pixel R32 during the time period T16 are a voltage corresponding to the grayscale value 64.

Of course, the grayscale value of the display data corresponding to each sub-pixel may also be the grayscale value 127, the grayscale value 255, etc., which can be determined according to the requirements of practical applications, and are not limited here.

In the embodiment of the present disclosure, as shown in FIG. 6A, the set edge of the compensation trigger signal TP1 may be a falling edge, and the compensation voltage is triggered by the falling edge of the compensation trigger signal TP1 and input to the data line connected to the corresponding sub-pixel. The falling edge of the compensation trigger signal is within the overlapping time. Exemplarily, a compensation voltage can be applied to the data line corresponding to the sub-pixel connected to the first gate line GA1 under a trigger of a first falling edge of the compensation trigger signal TP1, so that the compensation voltage can be input to the sub-pixel connected to the first gate line GA1. The compensation voltage can be applied to the data line corresponding to the sub-pixel connected to the second gate line GA2 under a trigger of a second falling edge of the compensation trigger signal TP1, so that the compensation voltage can be input to the sub-pixel connected to the second gate line GA2. The compensation voltage can be applied to the data line corresponding to the sub-pixel connected to the third gate line GA3 under a trigger of a third falling edge of the compensation trigger signal TP1, so that the compensation voltage can be input to the sub-pixel connected to the third gate line GA3. The compensation voltage can be applied to the data line corresponding to the sub-pixel connected to the fourth gate line GA4 under a trigger of a fourth falling edge of the compensation trigger signal TP1, so that the compensation voltage can be input to the sub-pixel connected to the fourth gate line GA4. The compensation voltage can be applied to the data line corresponding to the sub-pixel connected to the fifth gate line GA5 under a trigger of a fifth falling edge of the compensation trigger signal TP1, so that the compensation voltage can be input to the sub-pixel connected to the fifth gate line GA5. The rest are similar, and so on, which will not be repeated here.

In the embodiment of the present disclosure, as shown in FIG. 6A, A represents the maintenance duration of the overlapping time. When the set edge of the compensation trigger signal TP1 is set as a falling edge, there is a first interval duration t1 between the falling edge and a starting moment of the overlapping time, and the first interval duration t1 may not be less than 1/2 A. If the falling edge of the compensation trigger signal TP1 is at an earlier position of the overlapping time, the target voltage on the data line may need to be changed to the compensation voltage quickly, which may easily increase power consumption. In the embodiment of the present disclosure, by setting t1=1/2 A, the target voltage on the data line can be loaded for a certain period of time, and then switched to the compensation voltage to avoid excessive power consumption. Exemplarily, t1=1/2 A, or t1=2/3 A, or t1=3/4 A. Of course, in practical applications, the specific duration of t1 can be determined according to requirements of practical applications, and is not limited here.

In the embodiment of the present disclosure, as shown in FIG. 6A, when the set edge of the compensation trigger signal TP1 is set as a falling edge, there may be a second interval duration t2 between the falling edge and an ending moment of the overlapping time. The second interval duration t2 is not greater than 1/2 A. Since the falling edge is within the overlapping time, t2>0. By setting t2≤1/2 A, the target voltage on the data line can be loaded for a certain period of time before switching to the compensation voltage to avoid excessive power consumption. Exemplarily, t2=1/2 A, or t2=1/3 A, or t2=1/4 A. Of course, in practical applications, the specific duration of t2 may be determined according to requirements of practical applications, and is not limited here.

It should be noted that the set edge of the compensation trigger signal TP1 can also be set as a rising edge, and the method of loading the compensation voltage triggered by the rising edge can refer to the above-mentioned method of loading the compensation voltage triggered by the falling edge, which will not be repeated here.

In the embodiment of the present disclosure, as shown in FIG. 6A, the set edge of the target trigger signal TP2 can be set as a falling edge, and the target voltage is triggered by the falling edge of the target trigger signal TP2 and input to the data line connected to the corresponding sub-pixel. Exemplarily, a target voltage can be applied to the data line corresponding to the sub-pixel connected to the first gate line GA1 under a trigger of the first falling edge of the target trigger signal TP2, so that the target voltage can be input to the sub-pixel connected to the first gate line GA1. The target voltage can be applied to the data line corresponding to the sub-pixel connected to the second gate line GA2 under a trigger of the second falling edge of the target trigger signal TP2, so that the target voltage can be input to the sub-pixel connected to the second gate line GA2. The target voltage can be applied to the data line corresponding to the sub-pixel connected to the third gate line GA3 under a trigger of the third falling edge of the target trigger signal TP2, so that the target voltage can be input to the sub-pixel connected to the third gate line GA3. The target voltage can be applied to the data line corresponding to the sub-pixel connected to the fourth gate line GA4 under a trigger of the fourth falling edge of the target trigger signal TP2, so that the target voltage can be input to the sub-pixel connected to the fourth gate line GA4. The target voltage can be applied to the data line corresponding to the sub-pixel connected to the fifth gate line GA5 under a trigger of the fifth falling edge of the target trigger signal TP2, so that the target voltage can be input to the sub-pixel connected to the fifth gate line GA5. The rest are similar, and so on, which will not be repeated here.

In the embodiment of the present disclosure, as shown in FIG. 6A, the falling edge of the target trigger signal TP2 can be after the ending moment of the overlapping time, so as to avoid the subsequent charging of the target voltage from causing influence to the sub-pixels already charged with the target voltage. Of course, the falling edge of the target trigger signal TP2 may also be aligned with the ending moment of the overlapping time. In this way, the influence of the target voltage charged later on the sub-pixels already charged with the target voltage can be avoided, and the sub-pixels can be charged with the target voltage in the maximum time, further improving the charging rate.

It should be noted that due to the delay of the signal, it may take a certain delay time when the gate-on signal is switched from a high level to a low level. After the delay time, the transition from the high level to the low level may be completed. If the set edge of the target trigger signal is within the delay time, it also belongs to the protection scope of the alignment mentioned in the present disclosure.

It should be noted that the set edge of the target trigger signal TP2 can also be set as a rising edge, and the way of loading the target voltage triggered by the rising edge can refer to the above-mentioned way of loading the target voltage triggered by the falling edge, which will not be repeated here.

In the embodiment of the present disclosure, the target trigger signal TP2 and the compensation trigger signal TP1 can be set as independent signals, so that the moment when the target voltage is input to the data line and the moment when the compensation voltage is input to the data line can be independently controlled.

Embodiments of the present invention provide other methods for driving display panels, which are modified for the implementation manners in the above-mentioned embodiments. The following only describes the differences between this embodiment and the above-mentioned embodiments, and the similarities will not be repeated here.

In the embodiment of the present disclosure, when the grayscale values of the display data corresponding to at least two sub-pixels are different grayscale values, the pre-charge voltage and the compensation voltage may be different. In this way, the compensation voltage can be set according to the actual target voltage, so that the compensation voltage can be flexibly controlled, and the effect of pre-charging can be further improved.

In an embodiment of the present disclosure, for the same sub-pixel, the relationship between the pre-charge voltage VY1, the compensation voltage VB1 and the target voltage VM1 which are charged to the sub-pixel may be: $VM1<VB1<VY1$. Since $VY1>VM1$, the sub-pixel will be brighter. That is, if the pre-charge voltage VY1 charged to the sub-pixel is greater than the target voltage VM1 corresponding to the sub-pixel, then the compensation voltage VB1 corresponding to the sub-pixel can satisfy: $VM1<VB1<VY1$. In the embodiment of the present disclosure, the compensation voltage VB1 can be set as an intermediate value between the pre-charge voltage VY1 and the target voltage VM1 by first switching the sub-pixel from the pre-charge voltage VY1 to the compensation voltage VB1, and then switching from the compensation voltage VB1 to the target voltage VM1, thereby increasing the charging rate, improving the abnormal brightness, and improving the picture display quality. In this way, the compensation voltage can be dynamically adjusted in real time according to the pre-charge voltage and target voltage corresponding to the sub-pixel, so that the compensation voltage of the display sub-pixels in the first row can be different from the compensation voltages of the display sub-pixels in other rows. The compensation voltages of the display sub-pixels all can also be set differently, thereby achieving precise compensation, further improving brightness uniformity, and improving display effects.

Of course, the compensation voltage VB1 can also follow the target voltage VM1 of the sub-pixel, which is equivalent to increasing the charging time of the target voltage, thereby increasing the charging rate.

In the embodiment of the present disclosure, for the same sub-pixel, the relationship between the pre-charge voltage VY2, the compensation voltage VB2 and the target voltage VM2 which are charged to the sub-pixel is: $VY2<VB2<VM2$. Since $VY2<VM2$, the sub-pixel will be darker. That is, if the pre-charge voltage VY2 charged to the sub-pixel is smaller than the target voltage VM2 corresponding to the sub-pixel, then the compensation voltage VB2 corresponding to the sub-pixel can satisfy: $VY2<VB2<VM2$. In the embodiment of the present disclosure, the compensation voltage VB2 can be set as an intermediate value between the pre-charge voltage VY2 and the target voltage VM2 by first switching the sub-pixel from the pre-charge voltage VY2 to the compensation voltage VB2, and then switching from the compensation voltage VB2 to the target voltage VM2, thereby increasing the charging rate, improving the abnormal brightness, and improving the picture display quality. In this way, the compensation voltage can be dynamically adjusted in real time according to the pre-charge voltage and target voltage corresponding to the sub-pixel, so that the compensation voltage of the display sub-pixels in the first row can be different from the compensation voltages of the display sub-pixels in other rows. The compensation voltages of the display sub-pixels all can also be set differently, thereby achieving precise compensation, further improving brightness uniformity, and improving display effects.

Of course, the compensation voltage VB2 can also follow the target voltage VM2 of the sub-pixel, which is equivalent to increasing the charging time of the target voltage, thereby increasing the charging rate.

Of course, the grayscale value of the compensation voltage corresponding to each display sub-pixel may also be the same. For example, when displaying a red solid-color picture with the grayscale value 64, the grayscale value of the compensation voltage of each display sub-pixel can be set to a grayscale value between grayscale values 0 and 64, for example, the grayscale value of the compensation voltage of each display sub-pixel is the grayscale value 40. In this way, it can also improve the display uniformity to a certain extent, and can reduce power consumption, and it is not necessary to reduce the amount of calculation and power consumption of the timing controller every time according to the difference between grayscale values of the pre-charge voltage and the target voltage.

It should be noted that when displaying a color image, the grayscale values of the target voltages corresponding to different display sub-pixels may be partly different, partly the same, or all different. For this, the compensation voltage can be dynamically adjust in real time according to the pre-charge voltage and target voltage corresponding to each display sub-pixel, so that the compensation voltage of the display sub-pixel can be accurately adjusted according to the specific charged pre-charge voltage and target voltage, further improving the brightness uniformity and improving the display effect.

In an embodiment of the present disclosure, according to the display data, controlling the display panel to sequentially apply a gate-on signal to the gate lines and input a voltage to the data lines, may specifically include: for sub-pixels electrically connected to the same data line, there is a grayscale value difference between the grayscale value of the display data corresponding to the sub-pixel connected to the Mth gate line and the grayscale value of the display data corresponding to the sub-pixel connected to the (M−1) th gate line; determining whether the grayscale value difference is not less than a grayscale value difference threshold. When it is determined that the grayscale value difference is not less than the grayscale value difference threshold, it can indicate that the brightness change (brightening or darkening) of the sub-pixel is more obvious, and it is easy to be noticed by human eyes. Therefore, during the overlapping time, after the sub-pixel electrically connected to the Mth gate line among the M gate lines is charged with the pre-charge voltage, a compensation voltage is input to the electrically connected data line. When it is determined that the grayscale value difference is less than the grayscale value difference threshold, it can indicate that the brightness change (brightening or darkening) of the sub-pixel is not too obvious, and it is not easy to be noticed by human eyes; and the abnormality of the displayed image can be negligible, so the target voltage can be directly input to the electrically connected data line.

In the embodiment of the present disclosure, the grayscale value difference threshold can be a grayscale value of 25, a grayscale value of 50, a grayscale value of 100, a grayscale value of 160, a grayscale value of 200, etc., which can be determined according to the actual application requirements, and is not limited here.

Of course, in the embodiment of the present disclosure, the above process of determining the grayscale value difference and determining the relationship between the grayscale value difference and the grayscale value difference threshold may not be additionally implemented. It is also possible to directly input the compensation voltage to the data line. This can reduce the amount of computation and reduce power consumption.

Exemplarily, taking the display panel with grayscale values of 0 to 255 as an example, if each red sub-pixel corresponds to display data with a grayscale value of 64, and the remaining sub-pixels correspond to display data with a grayscale value of 0, the display panel can display a red solid color screen. If each green sub-pixel corresponds to display data with a grayscale value of 64, and the remaining sub-pixels correspond to display data with a grayscale value of 0, the display panel can display a green solid color screen. If each blue sub-pixel corresponds to display data with a grayscale value of 64, and the remaining sub-pixels correspond to display data with a grayscale value of 0, the display panel can display a blue solid color screen.

Figure 8:
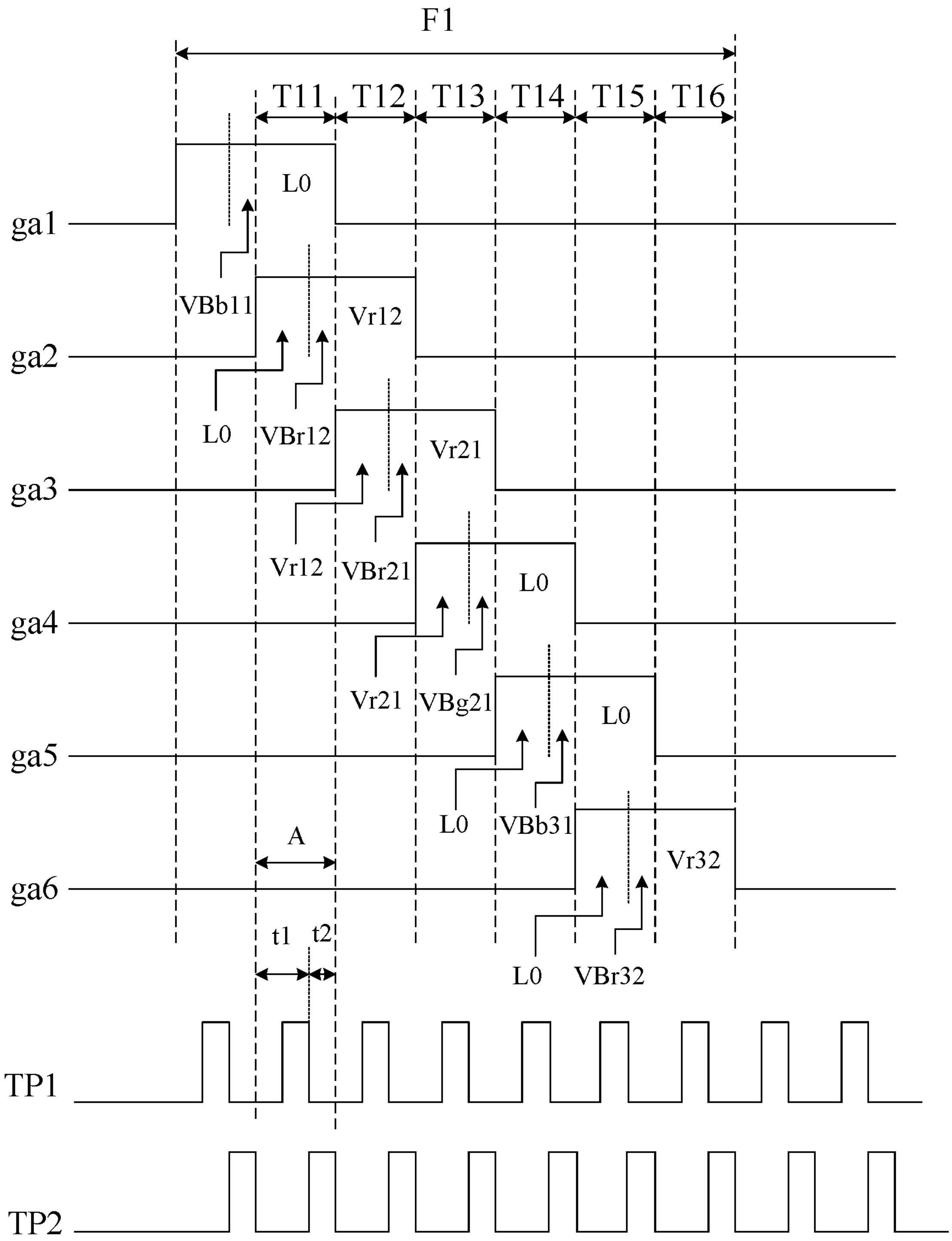
FIG. 8 is another timing diagram of signals provided by an embodiment of the present disclosure.

Exemplarily, a display of a red solid color screen, each red sub-pixel corresponding to display data with a grayscale value of 64, and the remaining sub-pixels corresponding to display data with a grayscale value of 0 are taken as an example. Combining FIG. 2 and FIG. 8, before the time period T11, the blue sub-pixel B11 can be charged with the compensation voltage VBb11 with a grayscale value of 0, and during the time period T11, the blue sub-pixel B11 is charged with the target voltage L0 with a grayscale value of 0. During the time period T11, the red sub-pixel R12 is sequentially charged with the pre-charge voltage L0 and the compensation voltage VBr12 with a grayscale value of 40, and during the time period T12, the red sub-pixel R12 is charged with the target voltage Vr12 with a grayscale value of 64. During the time period T12, the red sub-pixel R21 is sequentially charged with the pre-charge voltage Vr12 and the compensation voltage VBr21 with a grayscale value of 40, and during the time period T13, the red sub-pixel R21 is charged with the target voltage Vr21 with a grayscale value of 64. During the time period T13, the green sub-pixel G21 is charged with the pre-charge voltage Vr21 and the compensation voltage VBg21 with a grayscale value of 40 in sequence, and during the time period T14, the green sub-pixel G21 is charged with the target voltage L0 with a grayscale value of 0. During the time period T14, the blue sub-pixel B31 is charged with the pre-charge voltage L0 and the compensation voltage VBb31 with a grayscale value of 0 in sequence, and during the time period of T15, the blue sub-pixel B31 is charged with the target voltage L0 with a grayscale value of 0. During the time period T15, the red sub-pixel R32 is sequentially charged with the pre-charge voltage L0 and the compensation voltage VBr32 with a grayscale value of 40, and during the time period T16, the red sub-pixel R32 is charged with the target voltage with a grayscale value of 64.

It should be noted that the process of displaying the green solid color screen and the blue solid color screen may be basically the same as the above-mentioned process of displaying the red solid color screen, which will not be repeated here.

Figure 10:
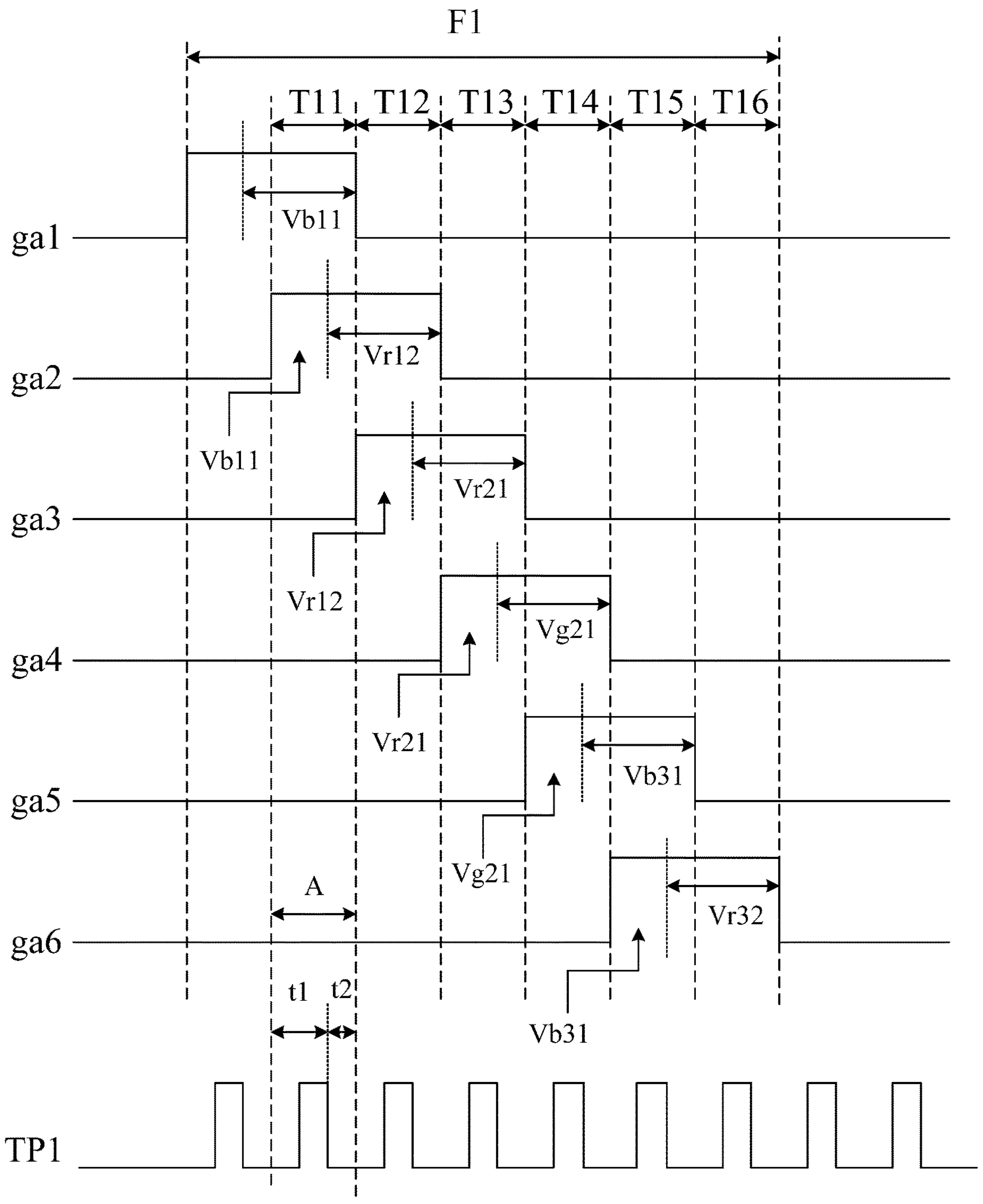
FIG. 10 is another timing diagram of signals provided by the embodiment of the present disclosure.

The embodiment of the present disclosure provides some other methods for driving the display panel, as shown in FIG. 10, which is modified for the implementation manner in the above-mentioned embodiments. The following only describes the differences between this embodiment and the above-mentioned embodiments, and the similarities will not be repeated here.

In the embodiment of the present disclosure, when the compensation voltage is set as the target voltage, the set edge of the compensation trigger signal may be set as the set edge of the target trigger signal that triggers the target voltage. In this way, there is no need to additionally set the target trigger signal, and the target voltage can be directly input to the data line under a trigger of the falling edge of the compensation trigger signal. In this way, after the data line is loaded with the previous target voltage, the next target voltage can be loaded directly according to the trigger of the falling edge of the compensation trigger signal, reducing voltage switching and further reducing power consumption.

Exemplarily, as shown in FIG. 10, the target voltage is triggered by the falling edge of the compensation trigger signal TP1 and input to the data line connected to the corresponding sub-pixel, so as to be input into the sub-pixel as the compensation voltage and the target voltage. Exemplarily, a target voltage can be applied to the data line corresponding to the sub-pixel connected to the first gate line GA1 under a trigger of the first falling edge of the compensation trigger signal TP1, so that the target voltage can be input to the sub-pixel connected to the first gate line GA1 and can be used as the compensation voltage and the target voltage. The target voltage can be applied to the data line corresponding to the sub-pixel connected to the second gate line GA2 under a trigger of the second falling edge of the compensation trigger signal TP1, so that the target voltage can be input to the sub-pixel connected to the second gate line GA2 and can be used as the compensation voltage and the target voltage. The target voltage can be applied to the data line corresponding to the sub-pixel connected to the third gate line GA3 under a trigger of the third falling edge of the compensation trigger signal TP1, so that the target voltage can be input to the sub-pixel connected to the third gate line GA3 and can be used as the compensation voltage and the target voltage. The target voltage can be applied to the data line corresponding to the sub-pixel connected to the fourth gate line GA4 under a trigger of the fourth falling edge of the compensation trigger signal TP1, so that the target voltage can be input to the sub-pixel connected to the fourth gate line GA4 and can be used as the compensation voltage and the target voltage. The target voltage can be applied to the data line corresponding to the sub-pixel connected to the fifth gate line GA5 under a trigger of the fifth falling edge of the compensation trigger signal TP1, so that the target voltage can be input to the sub-pixel connected to the fifth gate line GA5, and can be used as the compensation voltage and the target voltage. The rest are similar, and so on, which will not be repeated here.

It should be noted that, taking the set edge as the falling edge for an example, the falling edge of the compensation trigger signal TP1 in this embodiment can be equivalent to moving forward the falling edge of the TP signal that triggers the data voltage by a certain time in the related art, so that it is not necessary to additionally set redundant trigger signals, and it is only necessary to move forward the falling edge of the TP signal that has already been matured in the process, so as to reduce the cost of hardware and/or too much modification.

In the embodiment of the present disclosure, the grayscale value of the target voltage corresponding to the dummy sub-pixel adjacent to the display sub-pixel can be the same as the grayscale value of the target voltage corresponding to the display sub-pixel, and the compensation voltage and the target voltage of the display sub-pixel adjacent to the dummy sub-pixel are the same. For example, as shown in FIG. 2, taking the first row of sub-pixels as dummy sub-pixels for an example, the grayscale value of the target voltage corresponding to the red sub-pixel R11 is the same as the grayscale value of the target voltage corresponding to the red sub-pixel R21, and the compensation voltage corresponding to the red sub-pixel R21 is the same as the target voltage. The grayscale value of the target voltage corresponding to the green sub-pixel G11 is the same as the grayscale value of the target voltage corresponding to the green sub-pixel G21, and the compensation voltage corresponding to the green sub-pixel G11 is the same as the target voltage. The grayscale value of the target voltage corresponding to the blue sub-pixel B11 is the same as the grayscale value of the target voltage corresponding to the blue sub-pixel B21, and the compensation voltage corresponding to the blue sub-pixel B11 is the same as the target voltage.

Exemplarily, a display of a red solid color screen and each red sub-pixel corresponding to the display data of 255 grayscale values are taken as an example, referring to FIG. 2 and FIG. 10, before the time period T11, the blue sub-pixel B11 can be charged with the compensation voltage VBb11 with a grayscale value of 0, and during the time period T11, the blue sub-pixel B11 is charged with the target voltage L0 with a grayscale value of 0. During the time period T11, the red sub-pixel R12 is charged with the pre-charge voltage L0 and the compensation voltage VBr12 with a grayscale value of 127 in sequence, and during the time period T12, the red sub-pixel R12 is charged with the target voltage Vr12 with a grayscale value of 255. During the time period T12, the red sub-pixel R21 is charged with the pre-charge voltage Vr12 and the compensation voltage VBr21 with a grayscale value of 255 in sequence, and during the time period T13, the red sub-pixel R21 is charged with the target voltage Vr21 with a grayscale value of 255. During the time period T13, the green sub-pixel G21 is charged with the pre-charge voltage Vr21 and the compensation voltage VBg21 with a grayscale value of 127 in sequence, and during the time period T14, the green sub-pixel G21 is charged with the target voltage L0 with a grayscale value of 0. During the time period T14, the blue sub-pixel B31 is charged with the pre-charge voltage L0 and the compensation voltage VBb31 with a grayscale value of 0 in sequence, and during the time period T15, the blue sub-pixel B31 is charged with the target voltage L0 with a grayscale value of 0. During the time period T15, the red sub-pixel R32 is charged with the pre-charge voltage L0 and the compensation voltage VBr32 with a grayscale value of 127 in sequence, and during the time period T16, the red sub-pixel R32 is charged with the target voltage with a grayscale value of 255.

Figure 9A:
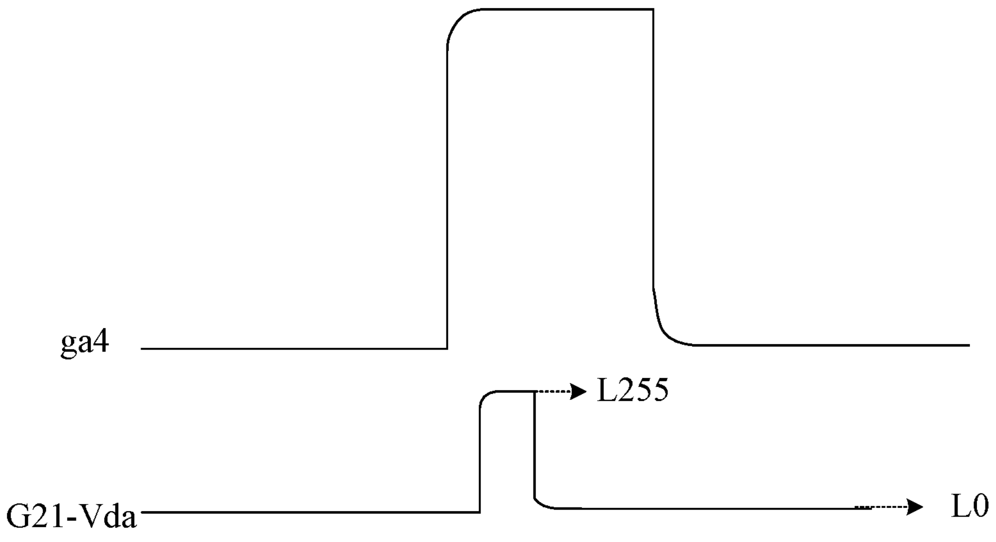
FIG. 9A is some schematic diagrams of a simulation provided by an embodiment of the present disclosure.
Figure 9B:
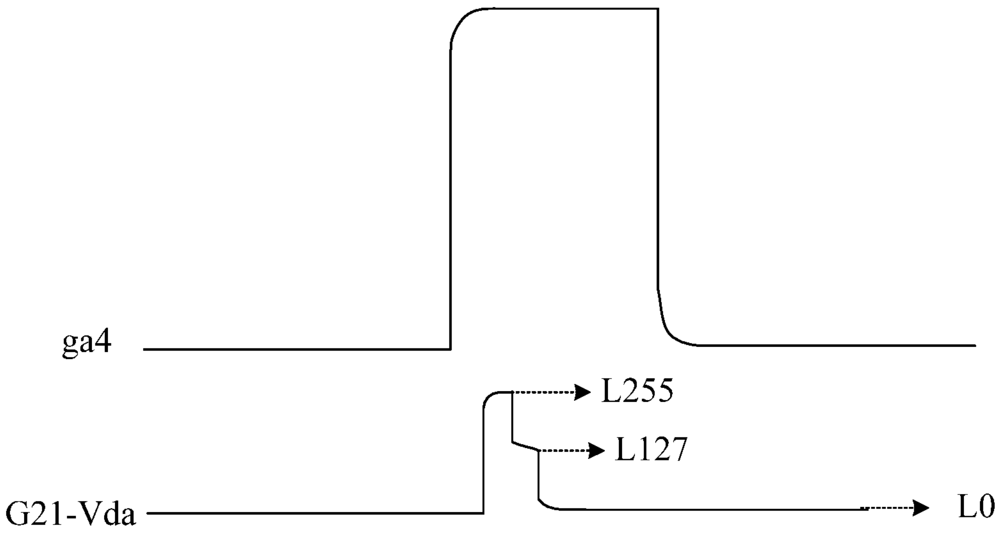
FIG. 9B is another schematic diagram of a simulation provided by the embodiments of the present disclosure.

The following takes the green sub-pixel G21 as an example to carry out a simulation. FIG. 9A is a schematic diagram of a simulation by using a driving method in the related art. FIG. 9B is a schematic diagram of a simulation by using a driving method in the embodiment of the present disclosure. Here, ga4 represents the signal on the fourth gate line GA4, and G21-Vda represents the voltage input to the green sub-pixel G21. As shown in FIG. 9A, the green sub-pixel G21 is first charged with a voltage L255 corresponding to a grayscale value of 255 as a pre-charge voltage, and then charged with a voltage L0 corresponding to a grayscale value of 0 as a target voltage. As shown in FIG. 9B, the green sub-pixel G21 is first charged with the voltage L255 corresponding to the grayscale value of 255 as the pre-charge voltage, then charged with the voltage L127 corresponding to the grayscale value of 127 as the compensation voltage, and then charged with the voltage L0 corresponding to the grayscale value of 0 as the target voltage. In this way, the charging rate can be improved, the abnormal brightness can be improved, and the picture display quality can be improved.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to the disk storage, compact disc read-only memory (CD-ROM), optical storage, etc.) having computer-usable program code embodied therein.

The present disclosure is described with reference to flowchart illustrations and/or block diagrams of methods, apparatus (systems), and computer program products according to embodiments of the disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, a special purpose computer, an embedded processor, or a processor of other programmable data processing equipment to produce a machine, such that the instructions executed by the processor of the computer or other programmable data processing equipment produce an apparatus for realizing the functions specified in one or more procedures of the flowchart and/or one or more blocks of the block diagram.

These computer program instructions may also be stored in a computer-readable memory capable of directing a computer or other programmable data processing equipment to operate in a specific manner, such that the instructions stored in the computer-readable memory produce an article of manufacture including instruction devices, and the instruction device realizes the function specified in one or more procedures of the flowchart and/or one or more blocks of the block diagram.

These computer program instructions can also be loaded onto a computer or other programmable data processing equipment, causing a series of operational steps to be performed on the computer or other programmable equipment to produce a computer-implemented process, so that the instructions performed on the computer or other programmable equipment provide steps for implementing the functions specified in one or more procedures of the flowchart and/or one or more blocks of the block diagram.

While preferred embodiments of the disclosure have been described, additional changes and modifications to these embodiments can be made by those skilled in the art once the basic inventive concept is appreciated. Therefore, it is intended that the appended claims be construed to cover the preferred embodiment as well as all changes and modifications which fall within the scope of the disclosure.

Apparently, those skilled in the art can make various modifications and variations to the embodiments of the present disclosure without departing from the spirit and scope of the embodiments of the present disclosure. In this way, if the modifications and variations of the embodiments of the present disclosure fall within the scope of the claims of the present disclosure and their equivalent technologies, the present disclosure also intends to include these modifications and variations.

What is claimed is:

1. A method for driving a display panel, comprising:

receiving display data of an image to be displayed in a current display frame; and controlling the display panel to apply a gate-on signal to gate lines in sequence, and input a voltage to data lines according to the display data;

wherein in response to gate-on signals loaded on adjacent M gate lines having an overlapping time, during the overlapping time, a pre-charge voltage and a compensation voltage are charged to an sub-pixel electrically connected to an Mth gate line of the M gate lines in sequence; wherein M is an integer and M≥2;

wherein the compensation voltage is triggered by a set edge of a compensation trigger signal to be input to the data line connected to a corresponding sub-pixel;

wherein the set edge of the compensation trigger signal is one of a rising edge and a falling edge, and the set edge of the compensation trigger signal is within the overlapping time;

wherein there is a first interval duration between the set edge and a starting moment of the overlapping time, and the first interval duration is not less than 1/2A; and there is a second interval duration between the set edge and an ending moment of the overlapping time, and the second interval duration is not greater than 1/2A;

wherein A represents a maintenance duration of the overlapping time.

2. The method according to claim 1, further comprising: in response to the gate-on signals loaded on adjacent M gate lines having the overlapping time, after the overlapping time and during a time when the gate-on signal is applied to the Mth gate line, charging the sub-pixel electrically connected to the Mth gate line with a target voltage corresponding to the display data.

3. The method according to claim 2, wherein the display panel comprises a plurality of sub-pixels of different colors, and the display data of the image to be displayed comprises: display data corresponding to each of the plurality of sub-pixels in a one-to-one manner;

wherein in response to a grayscale value of the display data corresponding to each sub-pixel being a same grayscale value, the pre-charge voltage, the compensation voltage and the target voltage are same.

4. The method according to claim 3, wherein the display panel comprises display sub-pixels and dummy sub-pixels, the display sub-pixels are in a display area, and the dummy sub-pixels are in a non-display area surrounding the display area; and a grayscale value of a target voltage corresponding to the dummy sub-pixel adjacent to the display sub-pixel is same as a grayscale value of a target voltage corresponding to the display sub-pixel.

5. The method according to claim 2, wherein the display panel comprises a plurality of sub-pixels of different colors, and the display data of the image to be displayed comprises: display data corresponding to each of the plurality of sub-pixels in a one-to-one manner;

wherein in response to grayscale values of the display data corresponding to at least two sub-pixels being different grayscale values, the pre-charge voltage and the compensation voltage are different.

6. The method according to claim 5, wherein for a same sub-pixel, a relationship between the pre-charge voltage VY1, the compensation voltage VB1 and the target voltage VM1 which are charged to the sub-pixel is: $VM1 \leq VB1 < VY1$.

7. The method according to claim 5, wherein for a same sub-pixel, a relationship between the pre-charge voltage VY2, the compensation voltage VB2 and the target voltage VM2 which are charged to the sub-pixel is: $VY2 < VB2 \leq VM2$.

8. The method according to claim 6, wherein the display panel comprises display sub-pixels and dummy sub-pixels, the display sub-pixels are in a display area, and the dummy sub-pixels are in a non-display area surrounding the display area;

a grayscale value of a target voltage corresponding to the dummy sub-pixel adjacent to the display sub-pixel is same as a grayscale value of a target voltage corresponding to the display sub-pixel; and a compensation voltage of the display sub-pixel adjacent to the dummy sub-pixel is same as the target voltage.

9. The method according to claim 7, wherein the controlling of the display panel to apply the gate-on signal to the gate lines in sequence, and input the voltage to the data lines according to the display data, comprises:

for sub-pixels electrically connected to a same data line, there is a grayscale value difference between a grayscale value of the display data corresponding to the sub-pixel connected to the Mth gate line and a grayscale value of the display data corresponding to the sub-pixel connected to an (M−1)th gate line;

determining whether the grayscale value difference is not less than a grayscale value difference threshold; and in response to the grayscale value difference not being less than the grayscale value difference threshold, during the overlapping time, after the sub-pixel electrically connected to the Mth gate line among the M gate lines is charged with the pre-charge voltage, inputting the compensation voltage to the data line electrically connected to the sub-pixel.

10. The method according to claim 1, wherein the target voltage is triggered by a set edge of a target trigger signal to be input to the data line connected to a corresponding sub-pixel; wherein the set edge of the target trigger signal is one of a rising edge and a falling edge;

wherein the set edge of the target trigger signal is aligned with the ending moment of the overlapping time or the set edge of the target trigger signal is after the ending moment of the overlapping time.

11. The method according to claim 10, wherein the compensation voltage is the target voltage, and the set edge of the compensation trigger signal is the set edge of the target trigger signal that triggers the target voltage.

12. A display apparatus, comprising:

a display panel; and a timing controller, configured to receive display data of an image to be displayed in a current display frame; and control the display panel to apply a gate-on signal to gate lines in sequence and input a voltage to data lines according to the display data;

wherein in response to gate-on signals loaded on adjacent M gate lines having an overlapping time, during the overlapping time, a pre-charge voltage and a compensation voltage are charged to an sub-pixel electrically connected to an Mth gate line of the M gate lines in sequence; wherein M is an integer and $M \geq 2$;

wherein the compensation voltage is triggered by a set edge of a compensation trigger signal to be input to the data line connected to a corresponding sub-pixel;

wherein the set edge of the compensation trigger signal is one of a rising edge and a falling edge, and the set edge of the compensation trigger signal is within the overlapping time;

wherein there is a first interval duration between the set edge and a starting moment of the overlapping time, and the first interval duration is not less than 1/2A; and there is a second interval duration between the set edge and an ending moment of the overlapping time, and the second interval duration is not greater than 1/2A;

wherein A represents a maintenance duration of the overlapping time.

13. The display apparatus according to claim 12, wherein the timing controller comprises a brightness correction module, configured to determine an input time of the compensation voltage and the compensation voltage according to the display data.

14. The display apparatus according to claim 12, wherein the display panel comprises:

a plurality of sub-pixels; wherein the plurality of sub-pixels are divided into a plurality of sub-pixel groups; and each of the plurality of sub-pixel groups comprises two adjacent sub-pixels in a same row;

a plurality of gate lines; wherein each sub-pixel row corresponds to two gate lines; one sub-pixel in each sub-pixel group is electrically connected to one of corresponding two gate lines, and the other sub-pixel in each sub-pixel group is electrically connected to the other one of the corresponding two gate lines; and a plurality of data lines; wherein a column of sub-pixel groups are arranged between every two adjacent data lines; and for two adjacent data lines, one data line is electrically connected to odd-numbered rows of a column of sub-pixel groups arranged between the two adjacent data lines, and the other data line is electrically connected to even-numbered rows of the column of sub-pixel groups arranged between the two adjacent data lines.

15. The display apparatus according to claim 12, wherein the plurality of sub-pixels comprise display sub-pixels and dummy sub-pixels; wherein the dummy sub-pixels are in a peripheral area of the display sub-pixels.

* * * * *